US009758047B2

(12) United States Patent
Hou et al.

(10) Patent No.: US 9,758,047 B2
(45) Date of Patent: Sep. 12, 2017

(54) DUAL VOLTAGE CHARGING SYSTEM WITH AN INTEGRATED ACTIVE FILTER AUXILIARY POWER MODULE

(71) Applicant: McMaster University, Hamilton (CA)

(72) Inventors: Ruoyu Hou, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 74 days.

(21) Appl. No.: 14/939,211

(22) Filed: Nov. 12, 2015

(65) Prior Publication Data

US 2016/0236580 A1 Aug. 18, 2016

Related U.S. Application Data

(60) Provisional application No. 62/115,694, filed on Feb. 13, 2015.

(51) Int. Cl.
*B60L 11/18* (2006.01)

(52) U.S. Cl.
CPC ....... *B60L 11/1811* (2013.01); *B60L 11/1838* (2013.01); *Y02T 10/7005* (2013.01)

(58) Field of Classification Search
CPC .......................... B60L 11/1811; B60L 11/1838
USPC .......................................................... 320/109
See application file for complete search history.

(56) References Cited

U.S. PATENT DOCUMENTS

| | | | |
|---|---|---|---|
| 4,967,136 A * | 10/1990 | Nofzinger | H02J 7/1423 320/116 |
| 6,909,201 B2 | 6/2005 | Murty et al. | |
| 6,923,279 B2 * | 8/2005 | Shimane et al. | B60K 6/28 180/65.1 |
| 7,180,205 B2 | 2/2007 | Wirdel | |
| 7,889,524 B2 * | 2/2011 | Lee et al. | H02J 7/022 307/10.1 |
| 8,723,473 B2 * | 5/2014 | Xu et al. | B60L 3/0046 320/101 |
| 8,895,173 B2 * | 11/2014 | Gandhi et al. | B60L 3/0046 429/120 |
| 2009/0103341 A1 | 4/2009 | Lee et al. | |
| 2010/0027304 A1 | 2/2010 | Wang et al. | |
| 2011/0090717 A1 | 4/2011 | Lee et al. | |

OTHER PUBLICATIONS

Hou et al., "Integrated Active Power Filter Auxiliary Power Modules for Electrified Vehicle Applications with Single-Phase Onboard Chargers", Jun. 2015, IEEE Transportion Electrification Conference and Expo (ITEC), Technical Digest, 6 pages.*

* cited by examiner

*Primary Examiner* — Sun Lin
(74) *Attorney, Agent, or Firm* — Bereskin & Parr LLP/S.E.N.C.R.L., s.r.l.

(57) ABSTRACT

Various embodiments are described herein for a dual-voltage charging system for electrified vehicles. In one example embodiment, the dual-voltage charging system comprises an integrated active filter auxiliary power module (AFAPM), the integrated AFAPM is applied as an active power filter (APF) to compensate low frequency harmonics in a high voltage (HV) battery charger when the HV battery is charging, and applied as a low voltage (LV) battery charger auxiliary power module (APM) when the HV battery stops the charging and starts to charge the LV battery.

20 Claims, 19 Drawing Sheets

DUAL VOLTAGE CHARGING SYSTEM WITH AN INTEGRATED ACTIVE FILTER AUXILIARY POWER MODULE

TECHNICAL FIELD

The described embodiments relate to a dual-voltage charging system, and in particular, to a dual-voltage charging system with an integrated active filter auxiliary power module (AFAPM) for an electrified vehicle.

BACKGROUND

In a single-phase on-board charger for electrified vehicles, second-order harmonic currents and corresponding ripple voltages exist on dc bus when a battery is charged via an AC power source. The low-frequency harmonic current is normally filtered using a bulk film capacitor or additional active power filter (APF) circuit. However, such a charger consisting of a bulk capacitor may suffer from various disadvantages, such as, low power density, high manufacturing cost, heavy weight etc.

SUMMARY

In one aspect, at least one embodiment described herein provides a dual-voltage charging system comprising: an AC power source for providing power; a charger coupled to the AC power source via a first switch, the first switch being operable between a connect mode to connect the charger to the AC power source and a disconnect mode to disconnect the charger from the AC power source; a high voltage battery coupled to the charger, wherein when the first switch is in the connect mode and the charger is connected to the AC power source, the dual-voltage charging system operates in filtering mode where the high voltage battery is charged using the AC power source; and an active filter auxiliary power module coupled to the high voltage battery and a low voltage battery, wherein when the first switch is in the disconnect mode and the charger is disconnected from the AC power source, the dual-voltage charging system operates in a charging mode where the high voltage battery charges the low voltage battery via the active filter auxiliary power module.

In some embodiments, the charger is a single-stage charger comprising an AC/DC converter and a DC/DC converter in one stage. In some other embodiments, the charger is a two-stage charger comprising a first stage consisting of an AC/DC PFC boost converter and a second stage consisting of a DC/DC converter. In some embodiments, the DC/DC converter is an isolated DC/DC converter.

In some embodiments, the active filter auxiliary power module is located between the first stage and the second stage.

In some embodiments, the active filter auxiliary power module is located between the first stage and the second stage via a second switch, and the second switch is operable between a first mode and a second mode, wherein in the first mode, the second switch is connected to the first stage and the second stage, and the dual-voltage charging system operates in the filtering mode, and in the second mode, the second switch is disconnected from the first stage and the second stage, and connected to the high voltage battery, and the dual-voltage charging system operates in the charging mode.

In some embodiments, the second switch is a mechanical double pole double throw switch.

In some embodiments, the active filter auxiliary power module comprises at least one ripple filter for filtering second-order frequency harmonics of the AC power source, at least one primary power switch coupled to the at least one ripple filter and operable to switch the dual-voltage charging system in the filtering mode; at least one secondary power switch operable to switch the dual-voltage charging system in the charging mode; at least one low voltage battery filter coupled to the at least one secondary power switch, the at least one low voltage battery filter and the at least one secondary power switch forming at least one DC/DC converter; and a transformer coupled to the at least one primary power switch on a primary side of the transformer and the at least one secondary power switch on a secondary side of the transformer.

In various embodiments, the transformer converts a high-voltage low-current second-order frequency harmonics to low-voltage high-current frequency harmonics.

In some embodiments, the AC power source is located external to an electrified vehicle, and the charger, the high voltage battery, the active filter auxiliary power module and the low voltage battery are located internal to the electrified vehicle.

In another aspect, in at least one embodiment described herein, there is provided an active filter auxiliary power module for use in a dual-voltage charging system within an electrified vehicle, the active filter auxiliary power module comprising: at least one ripple filter for filtering second-order frequency harmonics of an AC power source located external to the electrified vehicle and providing power to charge a high voltage battery within the electrified vehicle; at least one primary power switch coupled to the at least one ripple filter and operable to switch the dual-voltage charging system in a filtering mode wherein when the dual-voltage charging system in the filtering mode, the high voltage battery is charged by the AC power source via a charger; at least one secondary power switch operable to switch the dual-voltage charging system in a charging mode wherein when the dual-voltage charging system in the charging mode, a low voltage battery is charged by the high voltage battery; at least one low voltage battery filter coupled to the at least one secondary power switch, the at least one low voltage battery filter and the at least one secondary power switch forming at least one DC/DC converter; and a transformer coupled to the at least one primary power switch on a primary side of the transformer and the at least one secondary power switch on a secondary side of the transformer.

In another aspect, in at least one embodiment described herein, there is provided an active filter auxiliary power module for use in a dual-voltage charging system within an electrified vehicle, where the dual-voltage charging system comprises an external AC power source for providing power, a charger coupled to the AC power source via a first switch, the first switch being operable between a connect mode to connect the charger to the AC power source and a disconnect mode to disconnect the charger from the AC power source, and a high voltage battery coupled to the charger, wherein when the first switch is in the connect mode and the charger is connected to the AC power source, the dual-voltage charging system operates in filtering mode where the high voltage battery is charged using the AC power source, and wherein the active filter auxiliary power module is coupled to the high voltage battery and a low voltage battery, wherein when the first switch is in the disconnect mode and the charger is disconnected from the AC power source, the dual-voltage charging system operates in a charging mode where the high voltage battery charges the low voltage battery via the active filter auxiliary power module, the active filter auxiliary power module comprising: at least one ripple filter for filtering second-order frequency harmonics of the AC power source; at least one primary power switch coupled to the at least one ripple filter and operable to switch the dual-voltage charging system in the filtering mode; at least one secondary power switch operable to switch the dual-voltage charging system in the charging mode; at least one low voltage battery filter coupled to the at least one secondary power switch, the at least one low voltage battery filter and the at least one secondary power switch forming at least one DC/DC converter; and a transformer coupled to the at least one primary power switch on a primary side of the transformer and the at least one secondary power switch on a secondary side of the transformer.

In another aspect, in at least one embodiment described herein, there is provided a method for operating a dual-voltage charging system within an electrified vehicle, the method comprising: connecting a charger to an external AC power source via a first switch, the first switch being operable between a connect mode to connect the charger to the AC power source and a disconnect mode to disconnect the charger from the AC power source; coupling a high voltage battery to the charger, wherein when the first switch is in the connect mode and the charger is connected to the AC power source, the dual-voltage charging system operates in filtering mode where the high voltage battery is charged using the AC power source; and coupling an active filter auxiliary power module to the high voltage battery and a low voltage battery, wherein when the first switch is in the disconnect mode and the charger is disconnected from the AC power source, the dual-voltage charging system operates in a charging mode where the high voltage battery charges the low voltage battery via the active filter auxiliary power module.

In some embodiments, the charger is a single-stage charger comprising an AC/DC converter and a DC/DC converter in one stage.

In some embodiments, the charger is a two-stage charger comprising a first stage consisting of an AC/DC PFC boost converter and a second stage consisting of a DC/DC converter.

In some embodiments, the method further comprises coupling the active filter auxiliary power module to the first stage and the second stage.

In some embodiments, the method further comprises coupling the active filter auxiliary power module to the first stage and the second stage via a second switch, wherein the second switch is operable between a first mode and a second mode, and wherein in the first mode, the second switch is connected to the first stage and the second stage, and the dual-voltage charging system operates in the filtering mode, and in the second mode, the second switch is disconnected from the first stage and the second stage, and connected to the high voltage battery, and the dual-voltage charging system operates in the charging mode.

In some embodiments, the active filter auxiliary power module comprises: at least one ripple filter for filtering second-order frequency harmonics of the AC power source; at least one primary power switch coupled to the at least one ripple filter and operable to switch the dual-voltage charging system in the filtering mode; at least one secondary power switch operable to switch the dual-voltage charging system in the filtering mode; at least one low voltage battery filter coupled to the at least one secondary power switch, the at least one low voltage battery filter and the at least one secondary power switch forming at least one DC/DC converter; and a transformer coupled to the at least one primary power switch on a primary side of the transformer and the at least one secondary power switch on a secondary side of the transformer.

In various embodiments, the transformer converts a high-voltage low-current second-order frequency harmonics to low-voltage high-current frequency harmonics.

In various embodiments, the AC power source is located external to an electrified vehicle, and the charger, the high voltage battery, the active filter auxiliary power module and the low voltage battery are located internal to the electrified vehicle.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which.

Figure 1:
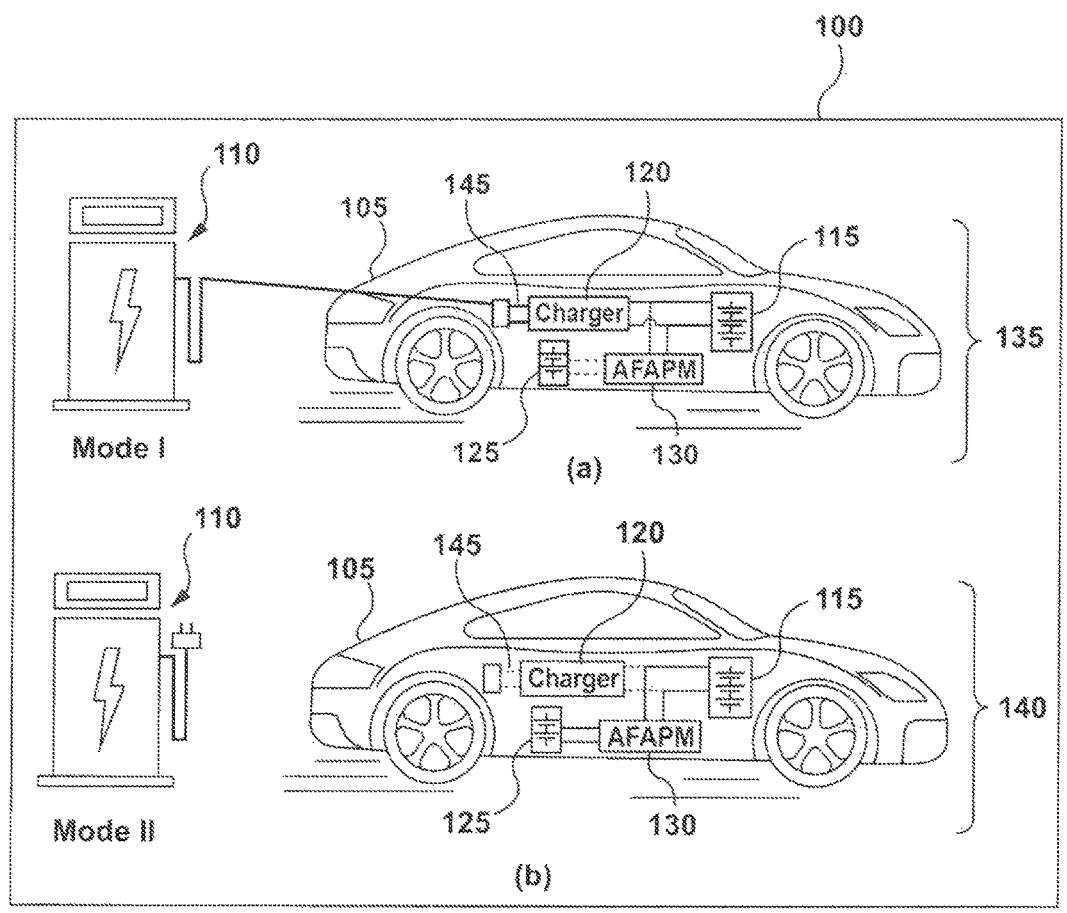
FIG. 1 is a dual-voltage charging system for an electrified vehicle according to an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical, electrical or magnetic connotation. For example, as used herein, the terms "coupled" or "coupling" can indicate that two elements or devices can be directly connected to one another or connected to one another through one or more intermediate elements or devices via an electrical element, electrical signal, a mechanical element or magnetic flux such as but not limited to, a wire, a cable, or magnetic field, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments disclosed herein relate to a dual-voltage charging system with an integrated active filter auxiliary power module (AFAPM). In particular, the various embodiments disclosed herein relate to a dual-voltage charging system that applies the integrated AFAPM as an active filter (APF) to compensate the low frequency harmonics in the high voltage (HV) battery charger when the HV battery is charging, and applies the integrated AFAPM as a low voltage (LV) battery charger auxiliary power module (APM) when the HV battery stops charging and starts to charge the LV battery.

Typically, in a single-phase high voltage (HV) battery charger of electrified vehicles, large capacitance is required to filter the low frequency current harmonics, especially the second-order harmonics. These low frequency current harmonics are mainly introduced by the fluctuation of the instantaneous input power. A typical value of such a bulk capacitor can be around 1500 µF/600V.

The DC-link capacitor typically used in the power electronics converters can be either electrolytic or film capacitors. Compared to film capacitors, the ratio between capacitance and volume of electrolytic capacitors is much higher. However the HV electrolytic capacitor tends to have many disadvantages, such as short lifetime and safety issues, when used in power systems in automotive applications. Accordingly, in various applications, film capacitors with low power density are preferred to be installed in the electrified vehicles rather than electrolytic capacitors. However, addition of bulk film capacitor in power electronics converters may result in large converter volume and low power density. These disadvantages may become more stringent for the on-board charger which is focused on light weight, small size and low cost.

The dual-voltage charging system according to the various embodiments disclosed herein eliminates the need for a bulk DC-link capacitor in the HV battery charger. This may provide the advantages of reduced cost and weight of the dual-voltage charging system.

In the various embodiments disclosed herein, a low voltage (LV) battery charger auxiliary power module (APM) is disclosed. The low voltage APM is proposed to be used as the active power filter (APF) to reduce the second-order harmonic current of the single-phase power factor correction when the high voltage (HV) battery is charging. An advantage of this low voltage APM is that the bulk capacitor can be removed.

In the various embodiments disclosed herein, two integration methods for the AFAPM are provided. In a half-integrated AFAPM, power switch components are shared between the active power filter or the APF and the auxiliary power module or the APM. In such embodiments, the dual-voltage charging system can operate as an APF to fulfill the active filtering function while no extra power switches, heat sinks and corresponding gate drivers may be required. In a full-integrated AFAPM, all the power switch components and filter components are shared between the APF and the APM. In such embodiments, the dual-voltage charging system can operate as an APF to fulfil the active filtering function while no extra power electronic components may be required. Such half-integrated and full-integrated AFAPM may provide the advantages of improved power density of the dual-voltage charging system, as well as reduced cost and weight of the dual-voltage charging system.

In the various embodiments disclosed herein, the HV battery charger can either be a single-stage charger, a two-stage charger with non-isolated DC/DC converter or a two-stage charger with isolated DC/DC converter. In the various embodiments disclosed herein, the integrated AFAPM is configured to be isolated or non-isolated depending on the HV battery charger structure and customer needs. In one example, any APF can be integrated into any APM DC/DC converter to form the integrated AFAPM.

Reference is first made to FIG. 1, which illustrates a dual-voltage charging system 100 for an electrified vehicle 105 according to an example embodiment. The dual-voltage charging system 100 comprises an external power charger 110, a high voltage (HV) battery 115, a low voltage (LV) battery 125, a high voltage (HV) battery charger 120, a switch 145 and an integrated AFAPM 130.

The external power charger 110 may be located at any electric vehicle charging station and when plugged into the vehicle 105, it charges the HV battery 115. The external power charger 110 charges the HV battery 115 through the HV battery charger 120. This is referred to herein as the filtering mode 135. In the illustrated embodiment, the external power charger 110 is a single-phase AC power source. In various other embodiments, the external power charger 110 may be a three-phase AC power source.

As illustrated in FIG. 1, in the filtering mode 135, the external power charger 110 is connected to the vehicle 105 at the HV battery charger 120. During this mode, switch 145 is turned on and the HV battery 115 starts charging. In the filtering mode 135, the integrated active filter auxiliary power module or AFAPM 130 is configured to be an active power filter or APF to compensate the second-order harmonics caused during the HV battery charging. As will be discussed in detail below, the AFAPM 130 may comprise a small capacitor, among other things, to filter the high frequency harmonic current. In some other cases, the AFAPM 130 may comprise a small inductor to filter the high frequency harmonic current. This may provide the advantage of eliminating the bulk capacitor typically found in battery chargers of electrified vehicles to filter the second-order harmonic during the charging of the HV battery 115.

When the switch 145 turns off, the external power charger 110 is disconnected from the vehicle 105 and the dual-voltage charging system 100 enters a charging mode. This is typically the case when the electrified vehicle 105 starts running on the road. During the charging mode 140, the HV battery 115 stops charging, and instead starts charging the LV battery 135 through the integrated AFAPM 130.

Even though the embodiments illustrated herein refer to an electrified vehicle, it is noted that the various embodiments disclosed herein can apply to other electrical transportation devices, and accordingly can be used in other applications, such as electrified ships, airplanes and aerospace applications.

Figure 2A:
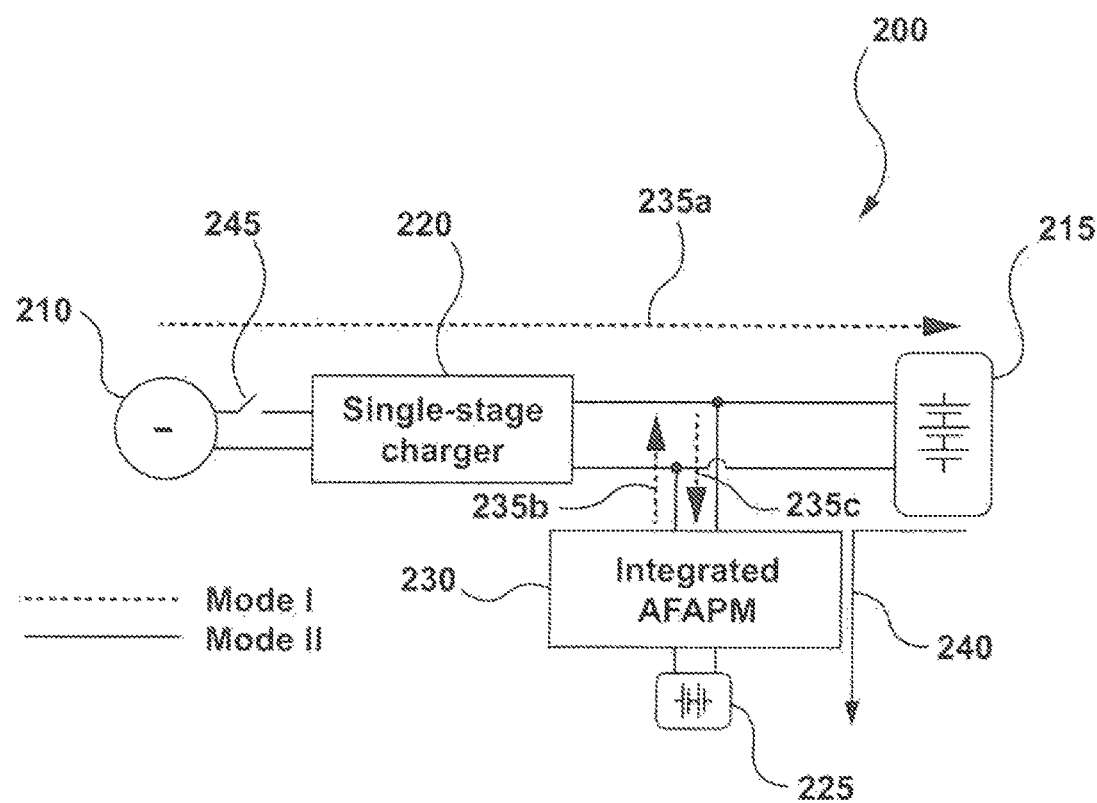
FIG. 2A is a dual-voltage charging system for an electrified vehicle according to another example embodiment.

Reference is next made to FIG. 2A, which illustrates a dual-voltage charging system 200 according to another example embodiment. Dual-voltage charging system 200 comprises an AC power source 210, a HV battery 215, a LV battery 225, a HV battery charger 220, a switch 245 and an integrated AFAPM 230.

During a filtering mode, switch 245 turns on, and the AC power source 210 charges the HV battery 215 through the HV battery charger 220. This is illustrated by power flow 235a. As well in the filtering mode, the integrated AFAPM 230 is configured to be an APF to compensate the low frequency harmonics caused by the AC power source 210. This is illustrated by power flows 235b and 235c.

In the illustrated embodiment, the HV battery charger 220 is a single-stage charger that combines both AC/DC and DC/DC converters in one stage. A single-stage charger compared to a double-stage charger, discussed below, may provide an advantage of compactness to the dual-voltage charging system 200.

During a charging mode, switch 245 is turned off and the AC power source 210 is disconnected from the HV battery charger 220. In this mode, the HV battery 215 charges the LV battery 225 via the integrated AFAPM 230, as illustrated by power flow 240.

In some embodiments, the HV battery charger, such as the HV battery charger 120 of FIG. 1 and HV battery charger 220 of FIG. 2A, may consist of an AC/DC rectifier and a DC/DC boost PFC (power factor correction) converter. In some other embodiments, the HV battery charger, such as the HV battery charger 120 of FIG. 1 and HV battery charger 220 of FIG. 2A, may consist of an AC/DC boost PFC converter. In some further embodiments, the HV battery charger, such as the HV battery charger 120 of FIG. 1 and HV battery charger 220 of FIG. 2A, may consist of an integrated AC/DC boost PFC converter and DC/DC converter.

In some embodiments, as illustrated in FIG. 1 and FIG. 2A, only one instance of HV battery charger is used in a dual-voltage charging system, such as the dual-voltage charging system 100 of FIG. 1 or the dual-voltage charging system 200 of FIG. 2A. In some other embodiments, multiple instances of HV battery chargers may be used in the dual-voltage charging system to achieve interleaving.

Figure 2B:
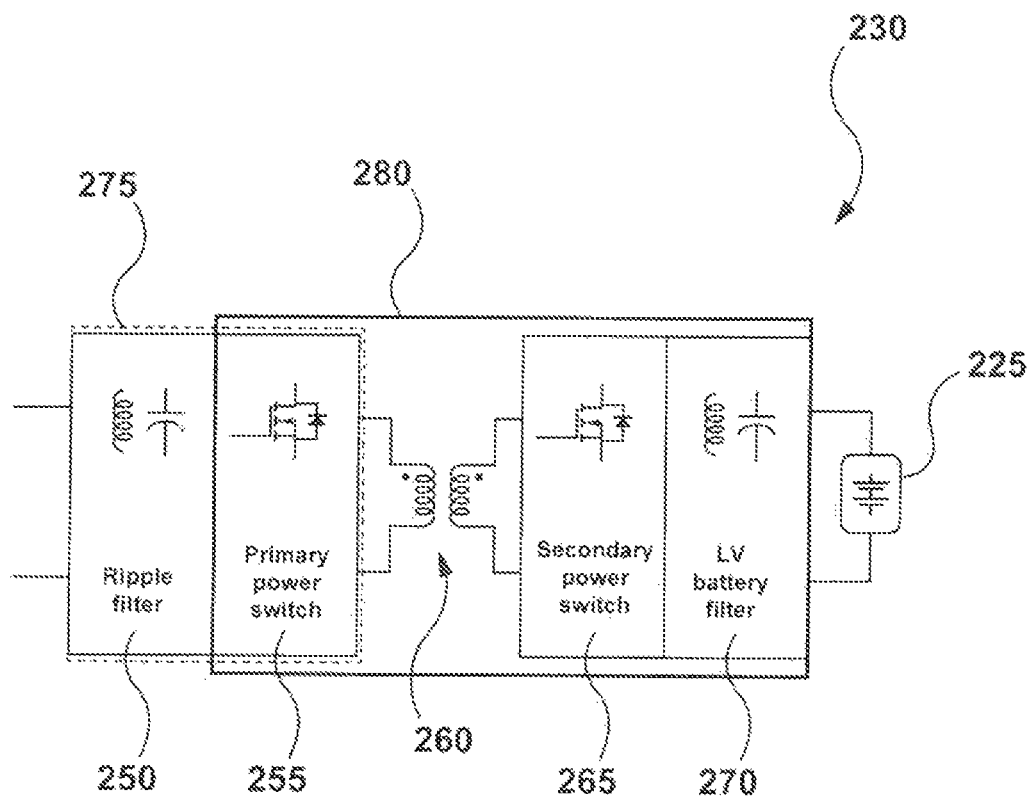
FIG. 2B is block diagram of an integrated active filter auxiliary power module (AFAPM) according to an example embodiment.

Reference is next made to FIG. 2B, which illustrates an integrated AFAPM 230 according to an example embodiment. Integrated AFAPM 230 comprises a ripple filter 250, a primary power switch 255, a transformer 260, a secondary power switch 265 and a LV battery filter 270. In the illustrated embodiment, the ripple filter 250 and the primary power switch 255 forms the APF 275, which is configured to filter the second-order harmonics during the charging of the HV battery, such as the HV battery 215. The primary power switch 255, the transformer 260, the secondary power switch 265 and the LV battery filter 270 forms the APM 280, which is configured to facilitate the charging of the LV battery, such as the LV battery 225 by the HV battery, such as the HV battery 215. As illustrated, the primary power switch 255 is shared by the APF 275 and the APM 280. This is referred to herein as a half-integration method.

In the various embodiments illustrated herein, the ripple filter 250 may comprise one or more inductor(s), one or more capacitor(s), or a combination of both, and is configured to filter the low order harmonics during the charging of the HV battery.

In the various embodiment illustrated herein, the primary power switch 255 and the secondary power switch 265 may comprise one or more diode(s), one or more thyristor(s), one or more BJT(s), one or more MOSFET(s) or one or more IGBT(s), or a combination of these with each other or with any other switching device. The primary power switch 255 is configured to switch the integrated AFAPM 230, and accordingly the dual-voltage charging system, in the filtering mode. The secondary power switch 265 is configured to switch the integrated AFAPM 230, and accordingly the dual-voltage charging system, in the charging mode.

Furthermore, in the integrated AFAPM 230, any number of primary power switches 255 may be used to form one or more DC/AC inverter(s) and one or more active power filter(s). Similarly, in the integrated AFAPM 230, any number of secondary power switches 265 and LV battery filters 270 may be used to form one or more AC/DC rectifier(s). In addition, in the integrated AFAPM 230, a combination of one or more DC/AC inverter(s) and AC/DC rectifier(s) may be used to achieve interleaving.

The transformer 260 is coupled to the primary power switch 255 on its primary side and the secondary power switch 265 on its secondary side. The transformer 260 is configured to convert high-voltage low-current second-order frequency harmonics to low-voltage high-current frequency harmonics. In the various embodiments illustrated herein, the transformer 260 may be any transformer of any size, shape or configuration.

Figure 3A:
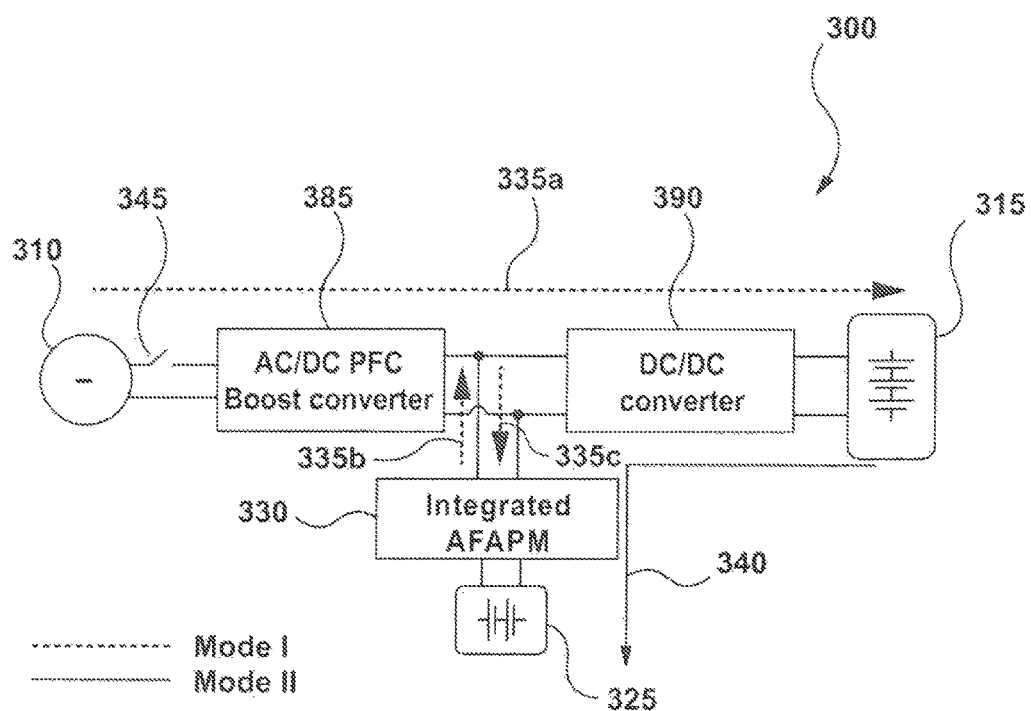
FIG. 3A is a dual-voltage charging system for an electrified vehicle according to an example embodiment.

Reference is next made to FIG. 3A, which illustrates a dual-voltage charging system 300 according to another example embodiment. Dual-voltage charging system 300 comprises an AC power source 310, a HV battery 315, a LV battery 325, a switch 345, an integrated AFAPM 330, an AC/DC PFC boost converter 385 and DC/DC converter 390.

In the embodiment of FIG. 3A, in the filtering mode, switch 345 is tuned on and the AC power source 310 charges the HV battery 315 through the AC/DC PFC boost converter 385 and DC/DC converter 390. This is illustrated by power flow 335a. As well in the filtering mode, the integrated AFAPM 330 is configured to be an APF to compensate the low frequency harmonics caused by the AC power source 310. This is illustrated by power flows 335b and 335c.

In the illustrated embodiment, the HV battery 315 is charged by the AC power source 310 using a two-stage charger, which includes the AC/DC PFC boost converter 385 followed by the DC/DC converter 390. A two-stage charger may provide the advantages of a high power factor, wide line regulation performance and clean charge current, compared to a single-stage charger, such as the single-stage charger used in FIG. 2A.

In some embodiments, the DC/DC converter 390 is a non-isolated DC/DC converter. In some other embodiments, the DC/DC converter 390 is an isolated DC/DC converter. The non-isolated DC/DC converter may provide the advantages of a smaller size, lower cost and higher efficiency of the dual-voltage charging system 300 compared to an isolated DC/DC converter. On the other hand, an isolated DC/DC converter may provide the advantage of higher safety compared to a non-isolated DC/DC converter.

During a charging mode, switch 345 is turned off and the AC power source 310 is disconnected from the HV battery 315. In this mode, the HV battery 315 charges the LV battery 325 via the DC/DC converter 390 and the integrated AFAPM 330, as illustrated by power flow 340.

In the illustrated embodiment, the integrated AFAPM 330 is positioned between the AC/DC PFC boost converter 385 and the DC/DC converter 390. As a result, during the filtering mode, the integrated AFAPM 330 compensates the second-order harmonic on the DC-link without any hardware change, and during the charging mode, the charging current flows through the DC/DC converter 390 and then through the integrated AFAPM 330 acting as an APM to charge the LV battery 325. In the embodiments where the DC/DC converter 390 is non-isolated, the integrated AFAPM 330 is isolated. And in the embodiments where the DC/DC converter 390 is isolated, the integrated AFAPM 330 can be non-isolated since the isolated DC/DC converter 390 provides enough isolation between the HV battery 315 and the LV battery 325.

In some embodiments, the AC/DC PFC boost converter 385 consists of an AC/DC rectifier and a DC/DC boost PFC converter. In some other embodiments, the AC/DC PFC boost converter 385 consists of an integrated AC/DC boost PFC converter. In some embodiments, the DC/DC converter 390 can be either isolated or non-isolated. In various embodiments illustrated herein, the dual-voltage charging system 300 may comprise one or more AC/DC PFC boost converter(s) 385 and one or more DC/DC converter(s) 390 to achieve interleaving.

Figure 3B:
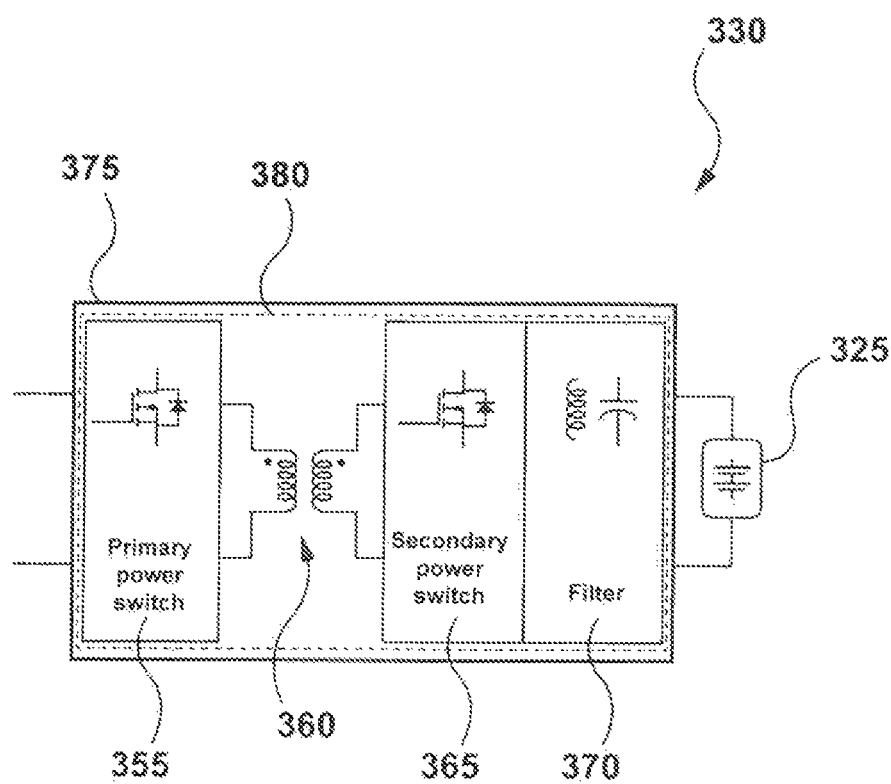
FIG. 3B is block diagram of an integrated AFAPM according to another example embodiment.

Reference is next made to FIG. 3B, which illustrates an integrated AFAPM 330 according to an example embodiment. Integrated AFAPM 330 comprises a primary power switch 355, a transformer 360, a secondary power switch 365 and a LV battery filter 370. In the illustrated embodiment, the primary power switch 355, the transformer 360, the secondary power switch 365 and the LV battery filter 370 are shared by both the APF 375 and the APM 380. This is referred to herein as a full-integration method. In the charging mode, the low frequency harmonics are transformed to the secondary side of the integrated AFAPM 330 and the ripple energy is stored in the filter 370.

In the various embodiments illustrated herein, the filter 370 may comprise of one or more inductor(s), one or more capacitor(s), or a combination of these. Similarly, in the various embodiments illustrated herein, the transformer 360 may be any transformer of any size, shape or configuration.

In the various embodiment illustrated herein, the primary power switch 355 and the secondary power switch 365 may comprise of one or more diode(s), one or more thyristor(s), one or more BJT(s), one or more MOSFET(s) or one or more IGBT(s), or a combination of these with each other or with any other material.

Furthermore, in the integrated AFAPM 330, any number of primary power switches 355, any number of secondary power switches 365 and any number of filters 370 may be used to form one or more DC/AC inverter(s), one or more AC/DC rectifier(s) and one or more active filter(s). In addition, in the integrated AFAPM 330, a combination of one or more DC/AC inverter(s) and one or more AC/DC rectifier(s) may be used to achieve interleaving.

Figure 4A:
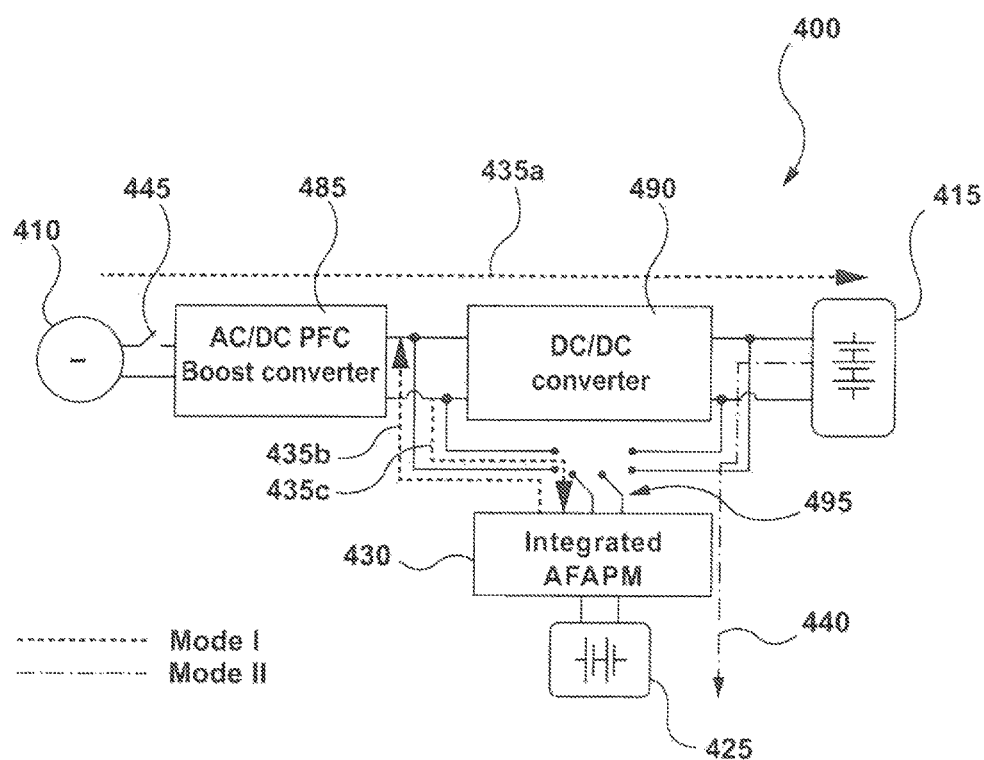
FIG. 4A is a dual-voltage charging system for an electrified vehicle according to another example embodiment.

Reference is next made to FIG. 4A, which illustrates a dual-voltage charging system 400 according to another example embodiment. Dual-voltage charging system 400 comprises an AC power source 410, a HV battery 415, a LV battery 425, a first switch 445, an integrated AFAPM 430, an AC/DC PFC boost converter 485, a DC/DC converter 490, and a second switch 495.

The second switch 495 couples the integrated AFAPM 430 between the first stage and the second stage on one side and to the HV battery 415 on the other side. The second switch 495 is operable between a first mode and a second mode. In the first mode, the second switch 495 is connected to the first stage and the second stage, and the dual-voltage charging system operates in the filtering mode. In the second mode, the second switch 495 is disconnected from the first stage and the second stage, and connected to the high voltage battery 415, and the dual-voltage charging system operates in the charging mode.

In the embodiment of FIG. 4A, in the filtering mode, the first switch 445 is tuned on and the second switch 495 is in the first mode, and the AC power source 410 charges the HV battery 415 through the AC/DC PFC boost converter 485 and DC/DC converter 490. This is illustrated by power flow 435*a*. As well in the filtering mode, the integrated AFAPM 430 is configured to be an APF to compensate the low frequency harmonics caused by the AC power source 410. This is illustrated by power flows 435*b* and 435*c*.

During a charging mode, the first switch 445 is turned off and the second switch 495 turns to a second mode (i.e. a LV charging mode) for the integrated AFAPM 430. In this mode, the AC power source 410 is disconnected from the HV battery 415, and the HV battery 415 charges the LV battery 425 via the integrated AFAPM 430, as illustrated by power flow 440.

In the various embodiments illustrated herein, the second switch 495 may be a mechanical double pole double throw (DPDT) switch. In some other embodiments, other types of switches may be used to switch the integrated AFAPM 430 between the filtering mode and the charging mode. In the illustrated embodiment, the integrated AFAPM 430 is isolated irrespective of whether the DC/DC converter 490 is isolated or non-isolated.

In some embodiments, the AC/DC PFC boost converter 485 consists of an AC/DC rectifier and a DC/DC boost PFC converter. In some other embodiments, the AC/DC PFC boost converter 485 consists of an integrated AC/DC boost PFC converter. In some embodiments, the DC/DC converter 490 can be either isolated or non-isolated. In various embodiments illustrated herein, the dual-voltage charging system 400 may comprise one or more AC/DC PFC boost converter(s) 485 and one or more DC/DC converter(s) 490 to achieve interleaving.

Figure 4B:
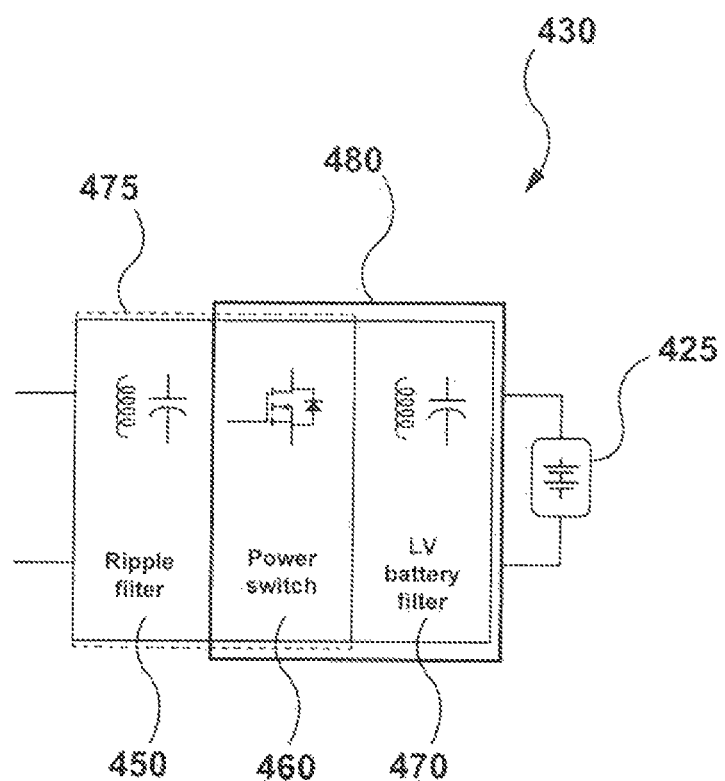
FIG. 4B is block diagram of an integrated AFAPM according to an example embodiment.

Reference is next made to FIG. 4B, which illustrates an integrated AFAPM 430 according to an example embodiment. Integrated AFAPM 430 comprises a ripple filter 450, a power switch 460 and a LV battery filter 470. In the illustrated embodiment, the ripple filter 450 and the power switch 460 forms the APF 475. The power switch 460 and the LV battery filter 470 forms the APM 480. In the illustrated embodiment, the power switch 460 is shared by both the APF 475 and the APM 480.

In the various embodiments illustrated herein, the ripple filter 450 may comprise of one or more inductor(s), one or more capacitor(s), or a combination of these. Similarly, in the various embodiments illustrated herein, the power switch 460 may comprise of one or more diode(s), one or more thyristor(s), one or more BJT(s), one or more MOSFET(s) or one or more IGBT(s), or a combination of these with each other or with any other material.

Furthermore, in the integrated AFAPM 430, any number of power switches 460 and any number of LV battery filters 470 may be used to form one or more DC/DC converter(s), and any number of power switches 460 and the ripple filters 450 may be used to form one or more active filter(s). In addition, in the integrated AFAPM 430, any number of power switches 460 may be used to achieve interleaving.

Figure 5A:
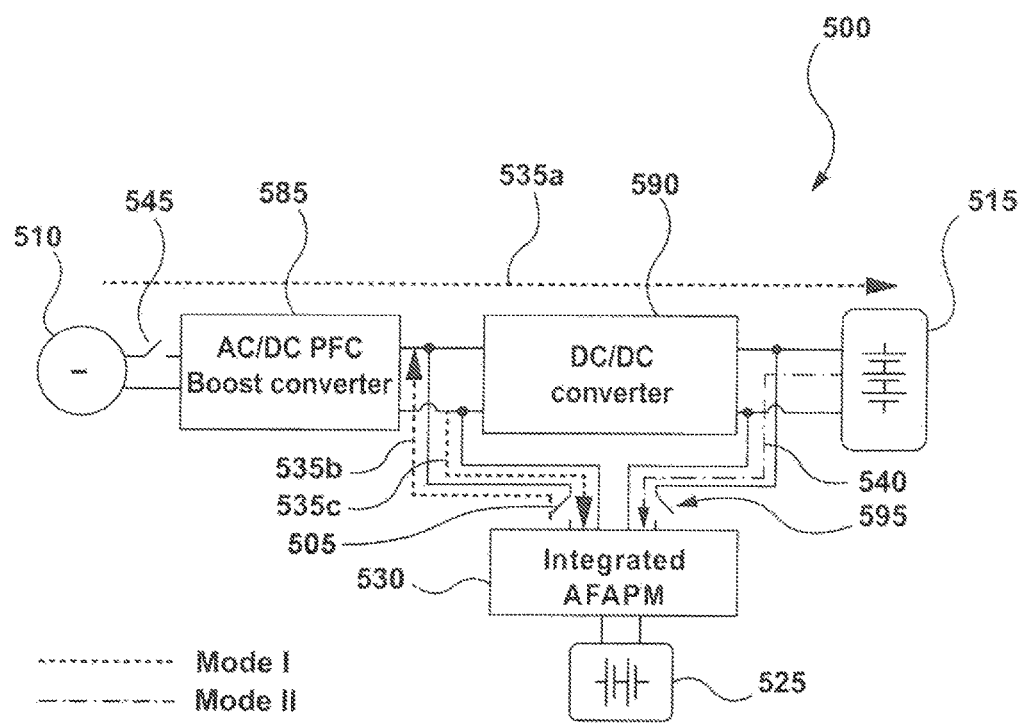
FIG. 5A is a dual-voltage charging system for an electrified vehicle according to an example embodiment.

Reference is next made to FIG. 5A, which illustrates a dual-voltage charging system 500 according to another example embodiment. Dual-voltage charging system 500 comprises an AC power source 510, a HV battery 515, a LV battery 525, a first switch 545, an integrated AFAPM 530, an AC/DC PFC boost converter 585, a DC/DC converter 590, a second switch 505 and a third switch 595.

In the embodiment of FIG. 5A, in the filtering mode, the first switch 545 turns on, the second switch turns on and the third switch turns off, and accordingly the AC power source 510 charges the HV battery 515 through the AC/DC PFC boost converter 585 and DC/DC converter 590. This is illustrated by power flow 535*a*. As well in the filtering mode, the integrated AFAPM 530 is configured to be an APF to compensate the low frequency harmonics caused by the AC power source 510. This is illustrated by power flows 535*b* and 535*c*.

During an operation mode, the first switch 545 is turned off, the second switch 505 is turned off and the third switch 595 is turned on. In this mode, the AC power source 510 is disconnected from the HV battery 515, and the HV battery 515 charges the LV battery 525 via the integrated AFAPM 530, as illustrated by power flow 540.

In some embodiments, the AC/DC PFC boost converter 585 consists of an AC/DC rectifier and a DC/DC boost PFC converter. In some other embodiments, the AC/DC PFC boost converter 585 consists of an integrated AC/DC boost PFC converter. In various embodiments illustrated herein, the dual-voltage charging system 500 may comprise one or more AC/DC PFC boost converter(s) 585 and one or more DC/DC converter(s) 590 to achieve interleaving.

Figure 5B:
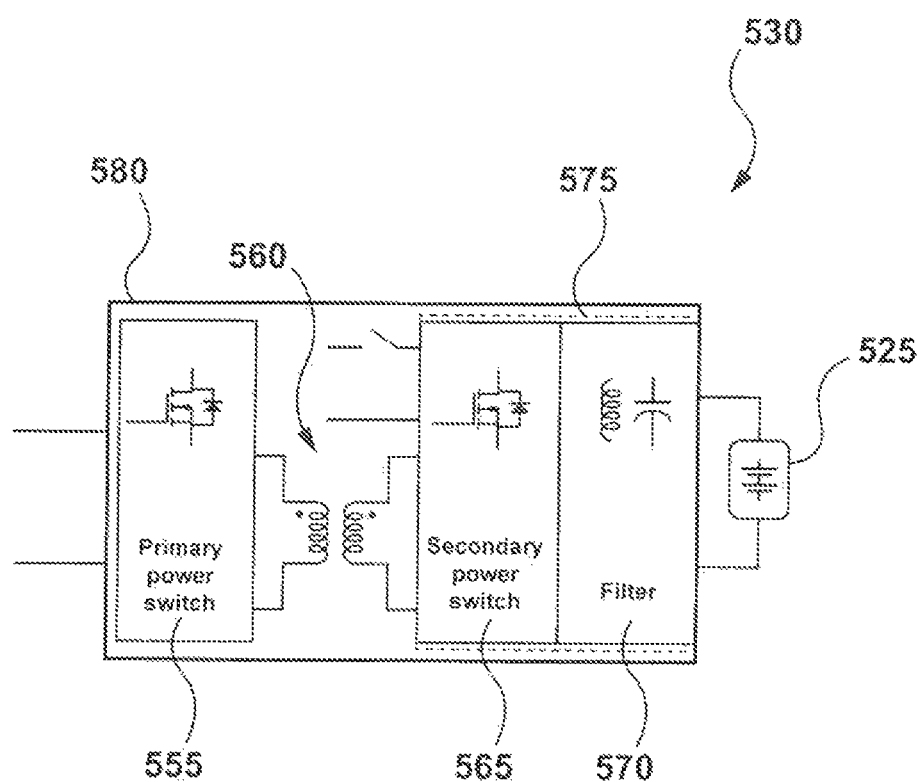
FIG. 5B is block diagram of an integrated AFAPM according to another example embodiment.

Reference is next made to FIG. 5B, which illustrates an integrated AFAPM 530 according to an example embodiment. Integrated AFAPM 530 comprises a primary power switch 555, a transformer 560, a secondary power switch 565 and a filter 570. In the illustrated embodiment, the secondary power switch 565 and the filter 570 forms the APF 575. The primary power switch 555, the transformer 560, the secondary power switch 565 and the filter 570 forms the APM 580. The secondary power switch 565 and the filter 570 are shared by the APF 575 and the APM 580.

In the various embodiments illustrated herein, the filter 570 may comprise one or more inductor(s), one or more capacitor(s), or a combination of both. Similarly, in the various embodiments illustrated herein, the transformer 560 may be any transformer of any size, shape or configuration.

In the various embodiment illustrated herein, the primary power switch 555 and the secondary power switch 565 may comprise one or more diode(s), one or more thyristor(s), one or more BJT(s), one or more MOSFET(s) or one or more IGBT(s), or a combination of these with each other or with any other material.

Furthermore, in the integrated AFAPM 530, any number of primary power switches 555 may be used to form one or more DC/AC inverter(s). Similarly, in the integrated AFAPM 530, any number of secondary power switches 565 and filters 570 may be used to form one or more AC/DC rectifier(s) and active filter(s). In addition, in the integrated AFAPM 530, a combination of one or more DC/AC inverter(s) and AC/DC rectifier(s) may be used to achieve interleaving.

Figure 6:
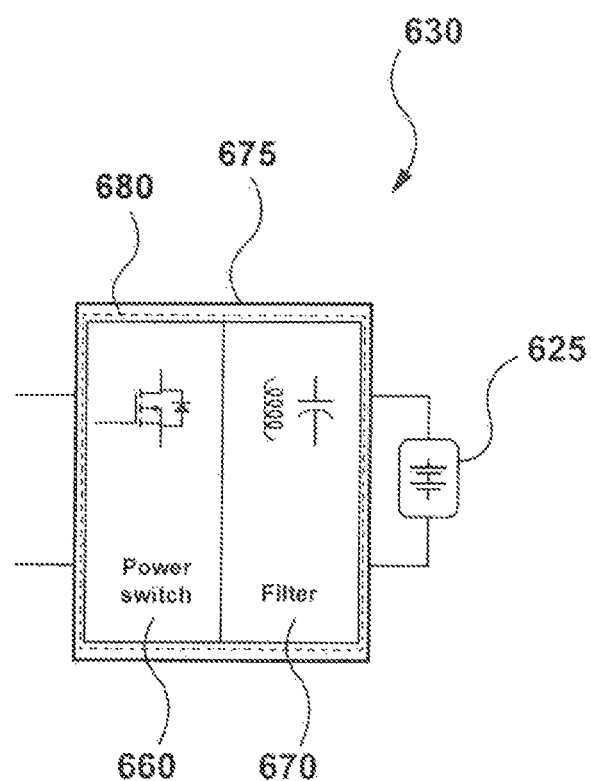
FIG. 6 is block diagram of an integrated AFAPM according to an example embodiment.

Reference is next made to FIG. 6, which illustrates a non-isolated integrated AFAPM 630 according to an example embodiment. The non-isolated integrated AFAPM 630 comprises a power switch 660 and a filter 670. In the illustrated embodiment, the power switch 660 and the filter 670 are shared by the APF 676 and the APM 680.

In the various embodiments illustrated herein, the filter 670 may comprise one or more inductor(s), one or more capacitor(s), or a combination of both. In the various embodiment illustrated herein, the power switch 660 may comprise one or more diode(s), one or more thyristor(s), one or more BJT(s), one or more MOSFET(s) or one or more IGBT(s), or a combination of these with each other or with any other material.

In the integrated AFAPM 630, any number of power switches 660 may be used to form one or more DC/DC converter(s) and active filter(s). Similarly, in the integrated AFAPM 630, one or more DC/DC converter(s) may be used to achieve interleaving.

Figure 7:
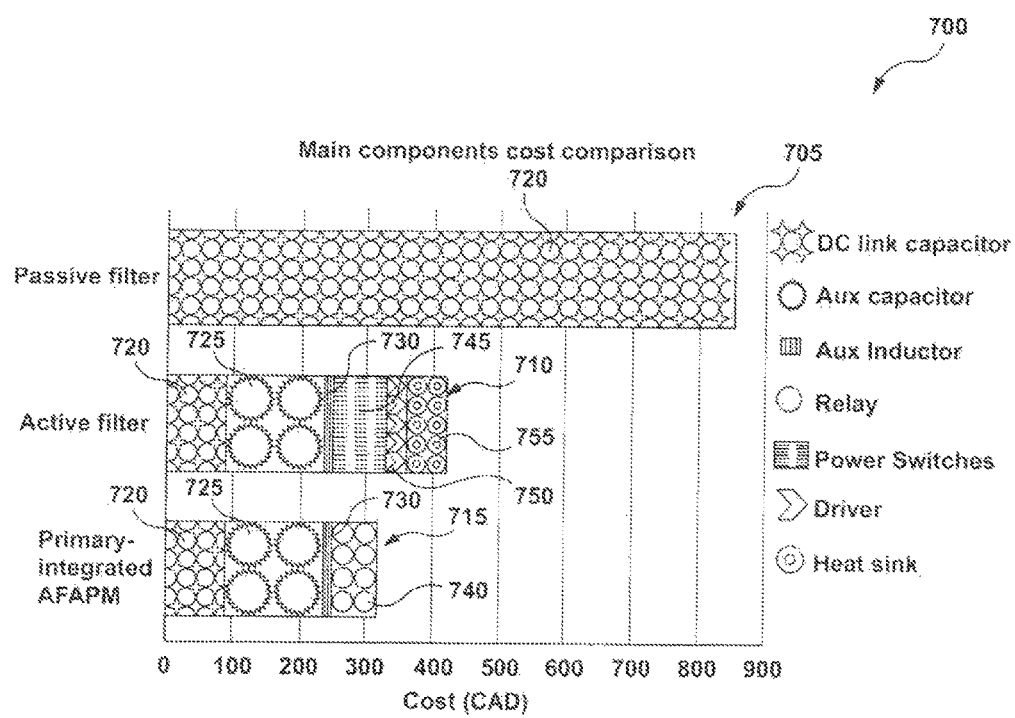
FIG. 7 illustrates a graphical representation of cost of components of various filtering methods used for mitigating the harmonics on DC-link according to an example embodiment.

Reference is next made to FIG. 7, which illustrates a graphical representation 700 comparing the cost of the components of various filtering methods used for mitigating the harmonics on the DC-link according to an example embodiment. As illustrated, plot 705 corresponds to the passive filter method for mitigating the harmonics on the DC link, plot 710 corresponds to the active filter method for mitigating the harmonics on the DC link, and plot 715 corresponds to the primary-integrated AFAPM method for mitigating the harmonics on the DC link.

As illustrated, the passive filter method is a traditional system that only uses a DC link capacitor 720 to mitigate the harmonics on the DC-link. Consequently, the cost associated with this method is the highest. The active filter method is a conventional process that uses additional active filter circuits to mitigate the harmonics on the DC-link current. As illustrated, the active filter method uses DC link capacitors 720, auxiliary capacitors 725, auxiliary inductors 730, power switches 745, drivers 750 and heat sinks 755. The primary-integrated AFAPM method, as illustrated in the various embodiments disclosed herein, uses DC link capacitors 720, auxiliary capacitors 725, auxiliary inductors 730 and relays 740. As illustrated, the most cost efficient method is the primary-integrated AFAPM.

Figure 8:
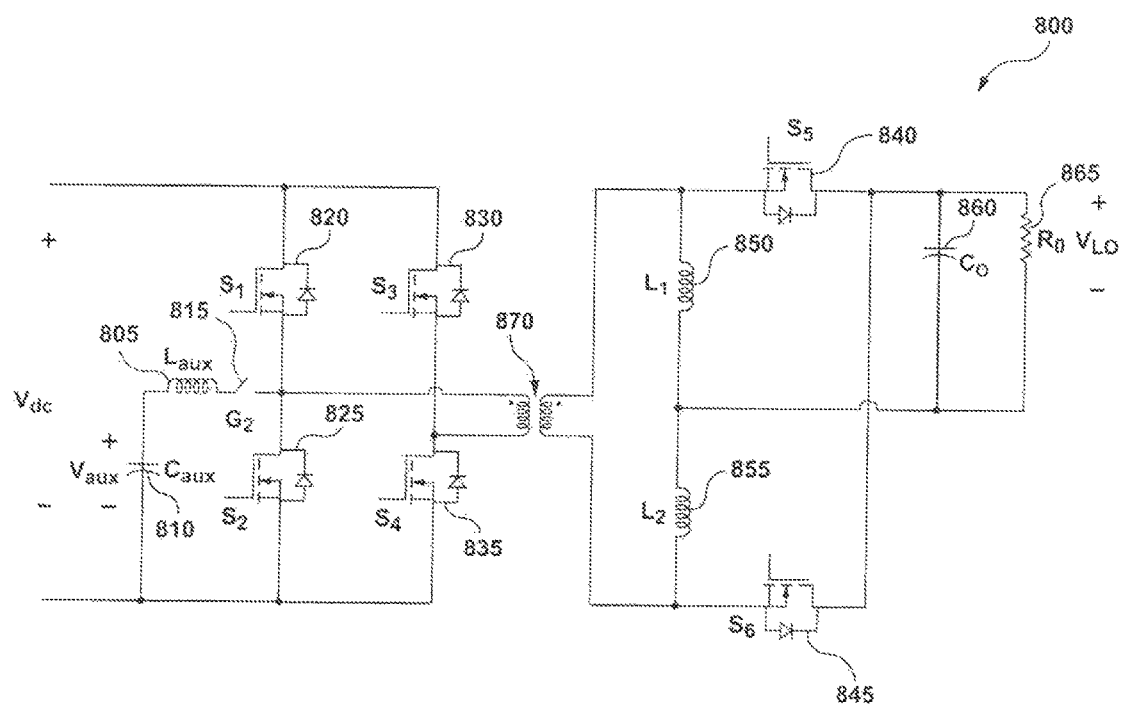
FIG. 8 illustrates a circuit diagram of an integrated AFAPM according to an example embodiment.

Reference is next made to FIG. 8, which illustrates a topology of an integrated AFAPM 800 according to an example embodiment. The integrated AFAPM 800 of the illustrated embodiment is formed by a full bridge current doubler circuit comprising an inductor $L_{aux}$ 805, a capacitor $C_{aux}$ 810, a relay G2 815, a first switch $S_1$ 820, a second switch $S_2$ 825, a third switch $S_3$ 830, a fourth switch $S_4$ 835, a fifth switch $S_5$ 840, a sixth switch $S_6$ 845, a first inductor 850, a second inductor 850, an output capacitor $C_O$ 860, an output resistor $R_O$ 865 and a transformer 870. The output resistor $R_O$ 865 may be an optional feature.

In the illustrated embodiment, the inductor $L_{aux}$ 805, the capacitor $C_{aux}$ 810, the relay G2 815, the first switch $S_1$ 820, the second switch $S_2$ 825, the third switch $S_3$ 830 and the fourth switch $S_4$ 835 form the primary side of the integrated AFAPM 800, and the first inductor 850, the second inductor 850, the fifth switch $S_5$ 840, the sixth switch $S_6$ 845, the output capacitor $C_O$ 860 and the output resistor $R_O$ 865 form the secondary side of the AFAPM 800. The primary side is isolated from the secondary side via transformer 870.

On the primary side, the first switch $S_1$ 820 and the second switch $S_2$ 825 are connected in series with each other, and the third switch $S_3$ 830 and the fourth switch $S_4$ 835 are connected in series with each other. Each of these series connections are in parallel to each other, i.e. the series combination of the first switch $S_1$ 820 and the second switch $S_2$ 825 is in parallel with the series combination of the third switch $S_3$ 830 and the fourth switch $S_4$ 835. The capacitor $C_{aux}$ 810 is connected with the point of connection between the first switch $S_1$ 820 and the second switch $S_2$ 825 via the inductor $L_{aux}$ 805 and the relay G2 815.

On the secondary side, the first inductor 850 and the second inductor 850 are connected in series with each other, the fifth switch $S_5$ 840 and the sixth switch $S_6$ 845 are connected in series with each other, and the series combination of the first inductor 850 and the second inductor 850 is connected in parallel to the series combination of the fifth switch $S_5$ 840 and the sixth switch $S_6$ 845. The output capacitor $C_O$ 860 and the output resistor $R_O$ 865 are connected in parallel to each other, both of which are connected in parallel to the first inductor 850 and the fifth switch $S_5$ 840.

In the illustrated embodiment, the inductor $L_{aux}$ 805, the capacitor $C_{aux}$ 810, and the first switch $S_1$ 820 and the second switch $S_2$ 825 compose a bidirectional buck-boost converter to store the ripple energy. In the illustrated embodiment, the inductor $L_{aux}$ 805 is used only to transfer the harmonic energy and the capacitor $C_{aux}$ 810 is used to store the harmonic energy. The relay G2 is turned on when the HV battery is charging and turned off when the LV battery is charging. The integrated APM 800 of FIG. 8 may have the advantage of eliminating additional MOSFET switches, gate drivers and heat sinks to achieve active filtering function.

Figure 9A:
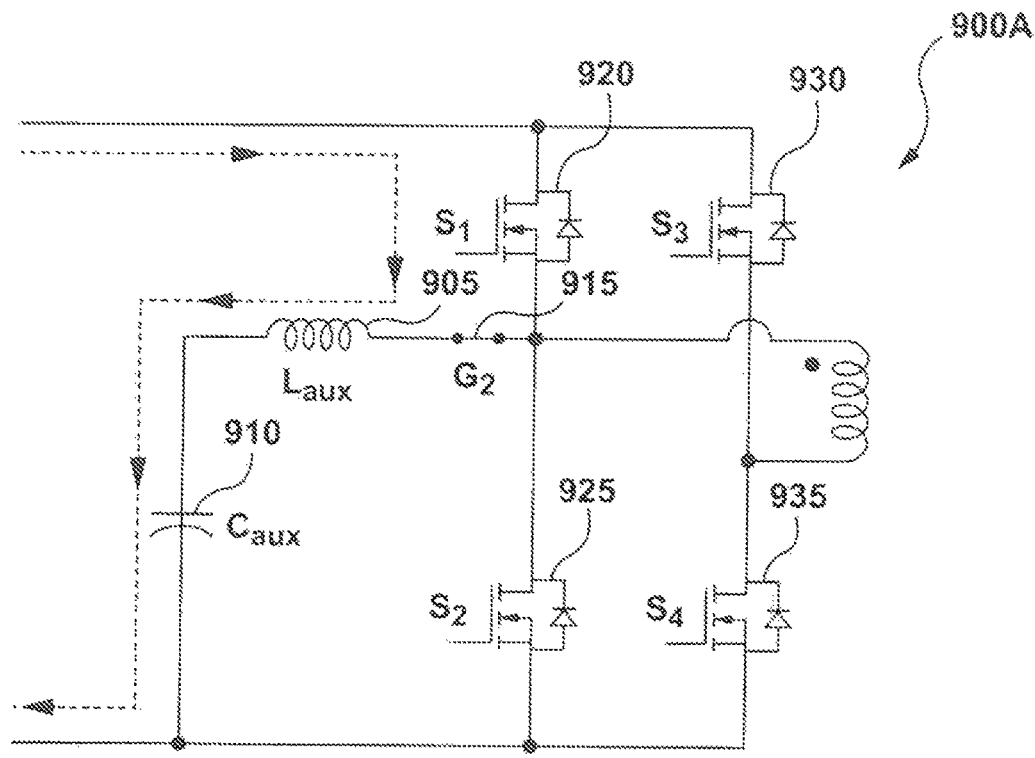
FIG. 9A illustrates a circuit diagram of operation of an integrated AFAPM in a buck mode with inductor current rising according to an example embodiment.
Figure 9B:
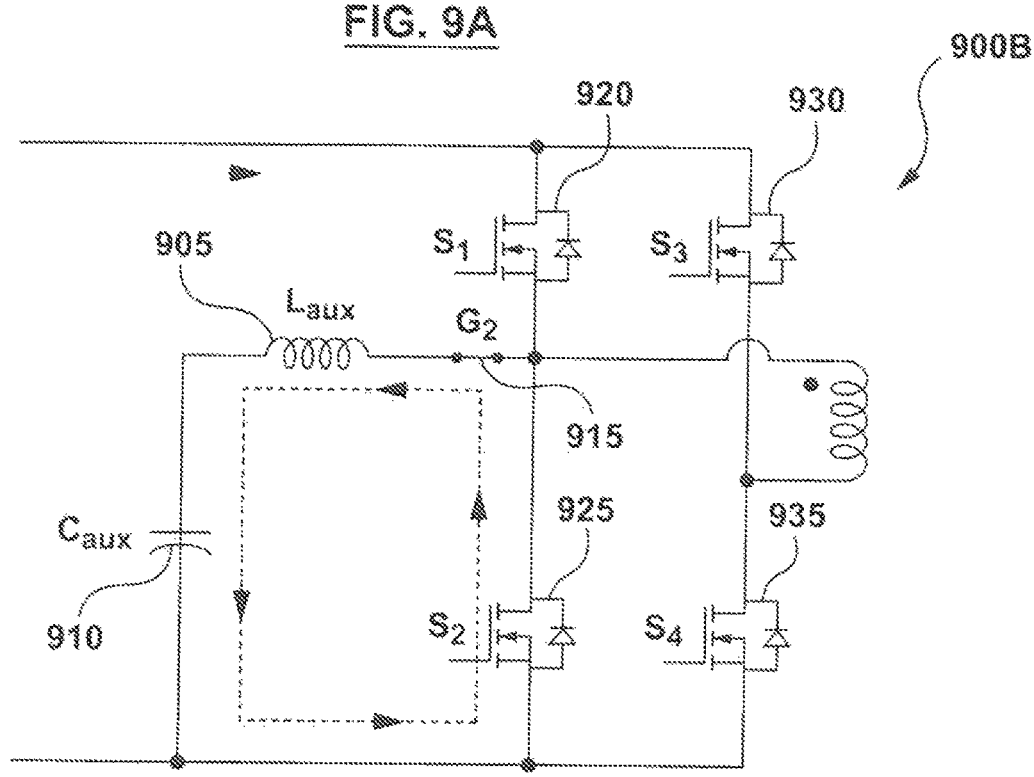
FIG. 9B illustrates a circuit diagram of operation of an integrated AFAPM in a buck mode with inductor current falling according to an example embodiment.
Figure 9C:
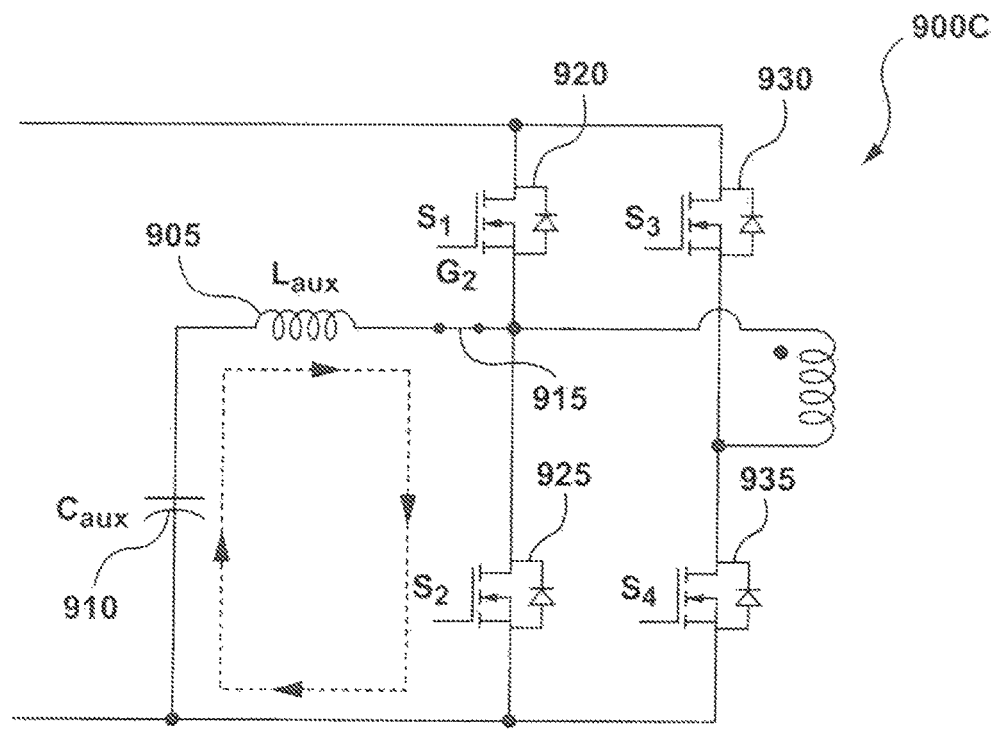
FIG. 9C illustrates a circuit diagram of operation of an integrated AFAPM in a boost mode with inductor current rising according to an example embodiment.
Figure 9D:
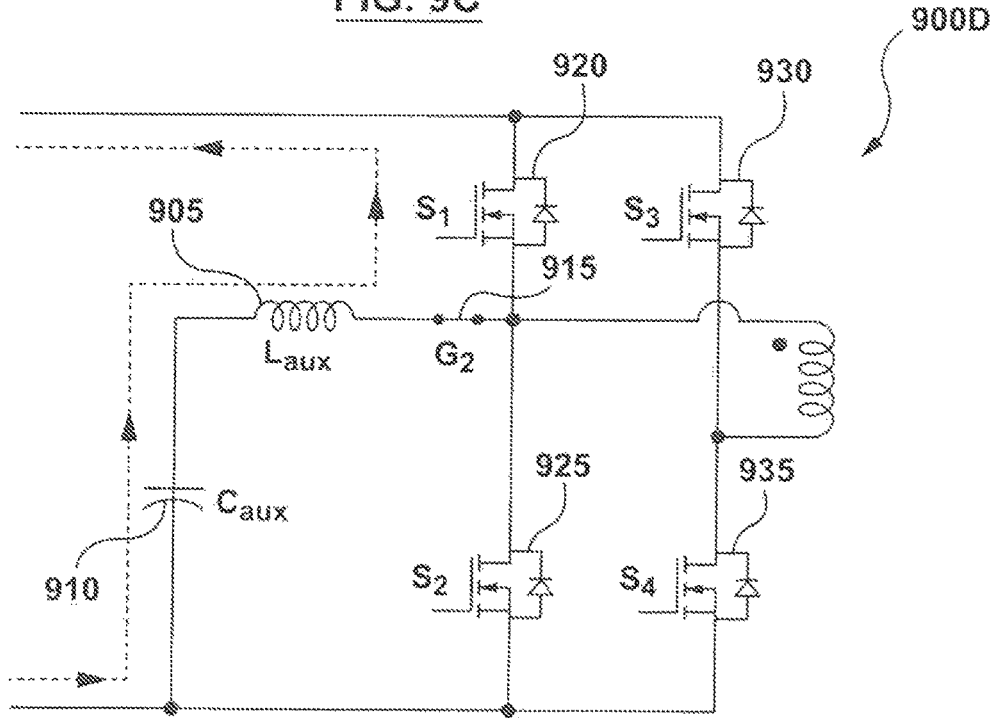
FIG. 9D illustrates a circuit diagram of operation of an integrated AFAPM in a boost mode with inductor current falling according to an example embodiment.

Reference is next made to FIGS. 9A-9D, which illustrate the operation of the integrated AFAPM 800 of FIG. 8 in different modes. FIG. 9A illustrates a circuit diagram 900A corresponding to the operation of the integrated AFAPM 800 of FIG. 8 in a buck mode with inductor current rising. FIG. 9B illustrates a circuit diagram 900B corresponding to the operation of the integrated AFAPM 800 of FIG. 8 in a buck mode with inductor current falling. FIG. 9C illustrates a circuit diagram 900C corresponding to the operation of the integrated AFAPM 800 of FIG. 8 in a boost mode with inductor current rising. FIG. 9D illustrates a circuit diagram 900D corresponding to the operation of the integrated AFAPM 800 of FIG. 8 in the boost mode with inductor current falling. In the embodiments of FIGS. 9A-9D, the respective circuit diagrams 900A-900D comprise an inductor $L_{aux}$ 905, a capacitor $C_{aux}$ 910, a relay G2 915, a first switch $S_1$ 920, a second switch $S_2$ 925, a third switch $S_3$ 930 and a fourth switch $S_4$ 935, which correspond to and are arranged analogously to the inductor $L_{aux}$ 805, the capacitor $C_{aux}$ 810, the relay G2 815, the first switch $S_1$ 820, the second switch $S_2$ 825, the third switch $S_3$ 830 and the fourth switch $S_4$ 835 of the integrated AFAPM 800 of FIG. 8.

Reference is again made to FIG. 9A, which illustrates the circuit diagram 900A of an integrated AFAPM in a buck mode with an increasing inductor current. In this mode, the vehicle is at a charging station and the HV battery is charging. The relay G2 915 is turned on in this mode. Once the second harmonic current ripple is higher than the DC component current, the integrated AFAPM assimilates harmonic current and turns the first switch $S_1$ 920 on. In this mode, the harmonic current charges both the inductor $L_{aux}$ 905 and the capacitor $C_{aux}$ 910. The inductor current rising rate can be calculated using equation 1.

$$\alpha_1 = \frac{V_{dc} - V_{aux}}{L_{aux}} \qquad (1)$$

Reference is again made to FIG. 9B, which illustrates the circuit diagram 900B of an integrated AFAPM in a buck mode with a falling inductor current. In this mode, the first switch $S_1$ 920 is turned off, and the inductor $L_{aux}$ 905 transfers its energy to capacitor $C_{aux}$ 910 through the second switch $S_2$ 925. In this mode, the inductor current falling rate can be calculated using equation 2.

$$\alpha_2 = \frac{-V_{aux}}{L_{aux}} \quad (2)$$

Reference is again made to FIG. 9C, which illustrates the circuit diagram 900C of an integrated AFAPM in a boost mode with an increasing inductor current. In this mode, when the second-order harmonic current ripple is lower than the DC component current, the integrated AFAPM releases energy back to the DC-link. In this mode, the second switch S$_2$ 925 is used to control the circuit in boost mode. During the turn-on interval of the second switch S$_2$ 925, the inductor L$_{aux}$ 905 is charged by the capacitor C$_{aux}$ 910. In this mode, the inductor current rising rate can be calculated using equation 3.

$$\beta_1 = \frac{V_{aux}}{L_{aux}} \quad (3)$$

Reference is again made to FIG. 9D, which illustrates the circuit diagram 900D of an integrated AFAPM in a boost mode with a falling inductor current. In this mode, the second switch S$_2$ 925 is turned off, and both the inductor L$_{aux}$ 905 and the capacitor C$_{aux}$ 910 are discharged and release the energy back to the DC-link through the first switch S$_1$ 920. In this mode, the inductor current falling rate can be calculated using equation 4.

$$\beta_2 = \frac{V_{aux} - V_{dc}}{L_{aux}} \quad (4)$$

Figure 10A:
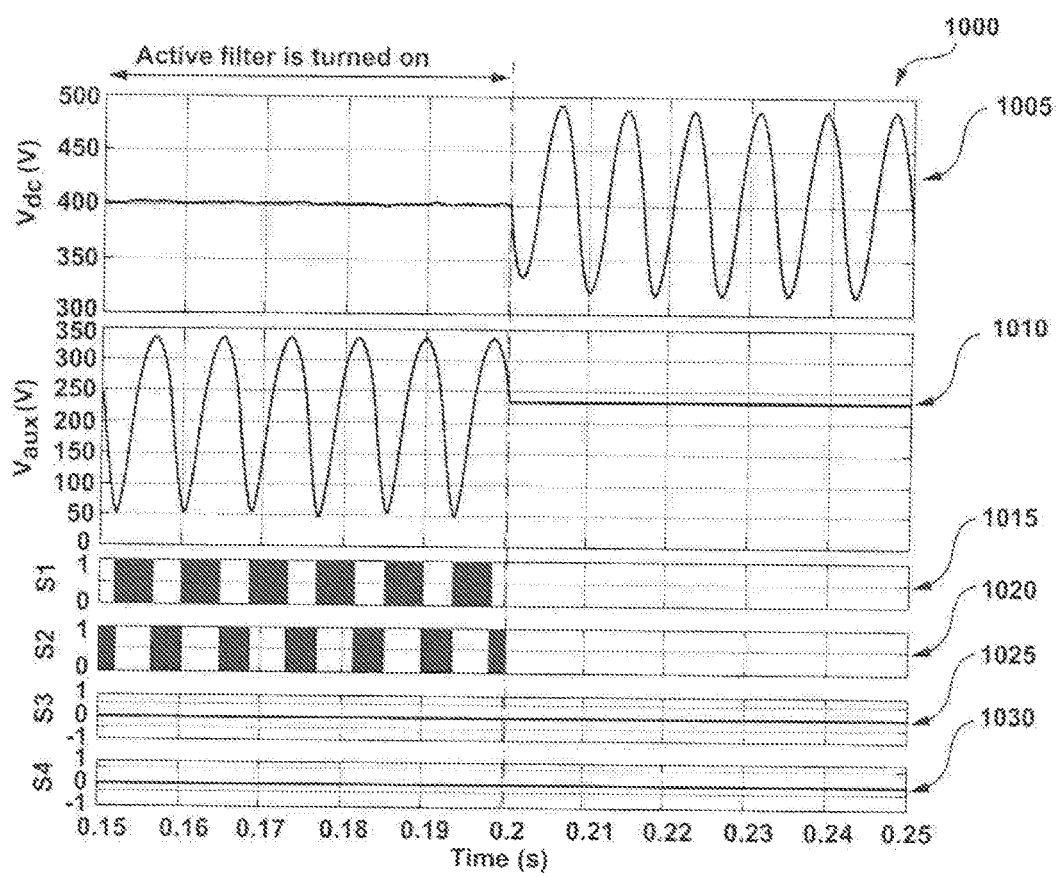
FIG. 10A illustrates a graphical representation of an integrated AFAPM working as an active power filter (APF) according to an example embodiment.

Reference is made to FIG. 10A, which illustrates a graph 1000 of an integrated AFAPM, such as the integrated AFAPM 800 of FIG. 8, working as an APF according to an example embodiment. Graph 1000 illustrates a plot 1005 corresponding to the voltage V$_{dc}$ measured on the primary side of the integrated AFAPM, and plot 1010 corresponding to voltage V$_{aux}$ measured across capacitor C$_{aux}$, such as capacitor C$_{aux}$ 810 of FIG. 8 or 910 of FIGS. 9A-9D. Graph 1000 further illustrates plot 1015 corresponding to the switching cycle of a first switch S$_1$, such as the first switch S$_1$ 820 of FIG. 8 or first switch S$_1$ 920 of FIGS. 9A-9D, plot 1020 corresponding to the switching cycle of a second switch S$_2$, such as the second switch S$_2$ 825 of FIG. 8 or second switch S$_2$ 925 of FIGS. 9A-9D, plot 1025 corresponding to the switching cycle of a third switch S$_3$, such as the third switch S$_3$ 830 of FIG. 8 or third switch S$_3$ 930 of FIGS. 9A-9D, and plot 1030 corresponding to the switching cycle of a fourth switch S$_4$, such as the fourth switch S$_4$ 835 of FIG. 8 or fourth switch S$_4$ 935 of FIGS. 9A-9D.

As illustrated in the graph 1000, at time before 0.2 s, the integrated AFAPM is operating in an active filtering mode as illustrated in plot 1005, and the first switch S$_1$ and the second switch S$_2$ are working with corresponding duty cycles as illustrated in plots 1015 and 1020 respectively. In this mode, the second-order harmonic energy is stored in the capacitor C$_{aux}$. Under this condition, the dc bus voltage V$_{dc}$ is equal to 400V with relatively small ripple. After 0.2 s, all of the four switches are turned off as illustrated in plots 1015, 1020, 1025 and 1030. As illustrated in plot 1005, a large second-order harmonics is observed on the DC-link V$_{dc}$.

Figure 10B:
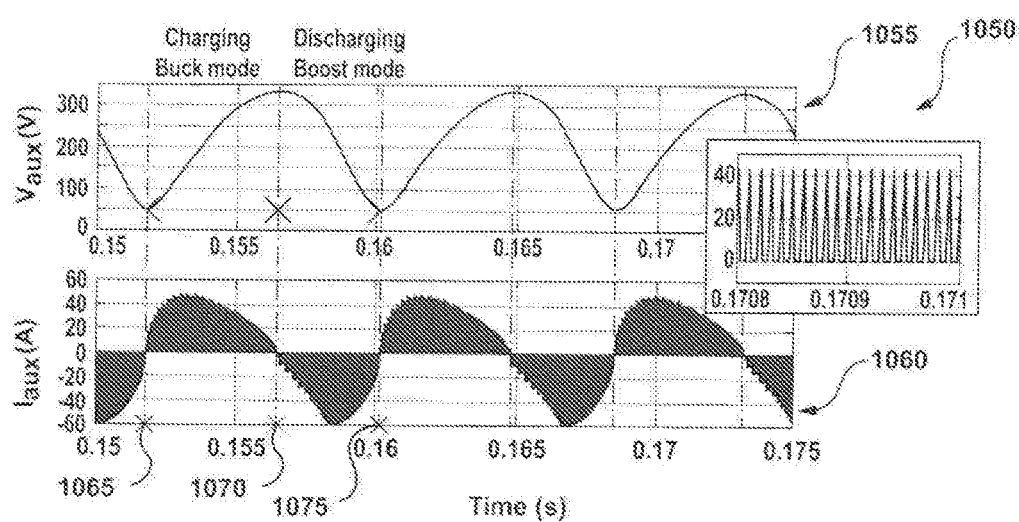
FIG. 10B illustrates a graphical representation of an integrated AFAPM working as an APF according to another example embodiment.

Reference is made to FIG. 10B, which illustrates a graph 1050 of an integrated AFAPM, such as the integrated AFAPM 800 of FIG. 8, working as an APF according to another example embodiment. Graph 1050 comprises a plot 1055 corresponding to voltage V$_{aux}$ measured across capacitor C$_{aux}$, such as capacitor C$_{aux}$ 810 of FIG. 8 or 910 of FIGS. 9A-9D, and plot 1060 corresponding to current I$_{aux}$ measured through the capacitor C$_{aux}$.

As illustrated in plot 1055, over the duration of time when the integrated AFAPM is operating in a charging buck mode, i.e. between a first time 1065 and a second time 1070, the current I$_{aux}$ is positive, and over the duration of time when the integrated AFAPM is operating in a discharging boost mode, i.e. between the second time 1070 and a third time 1075, the current I$_{aux}$ is negative.

Figure 11:
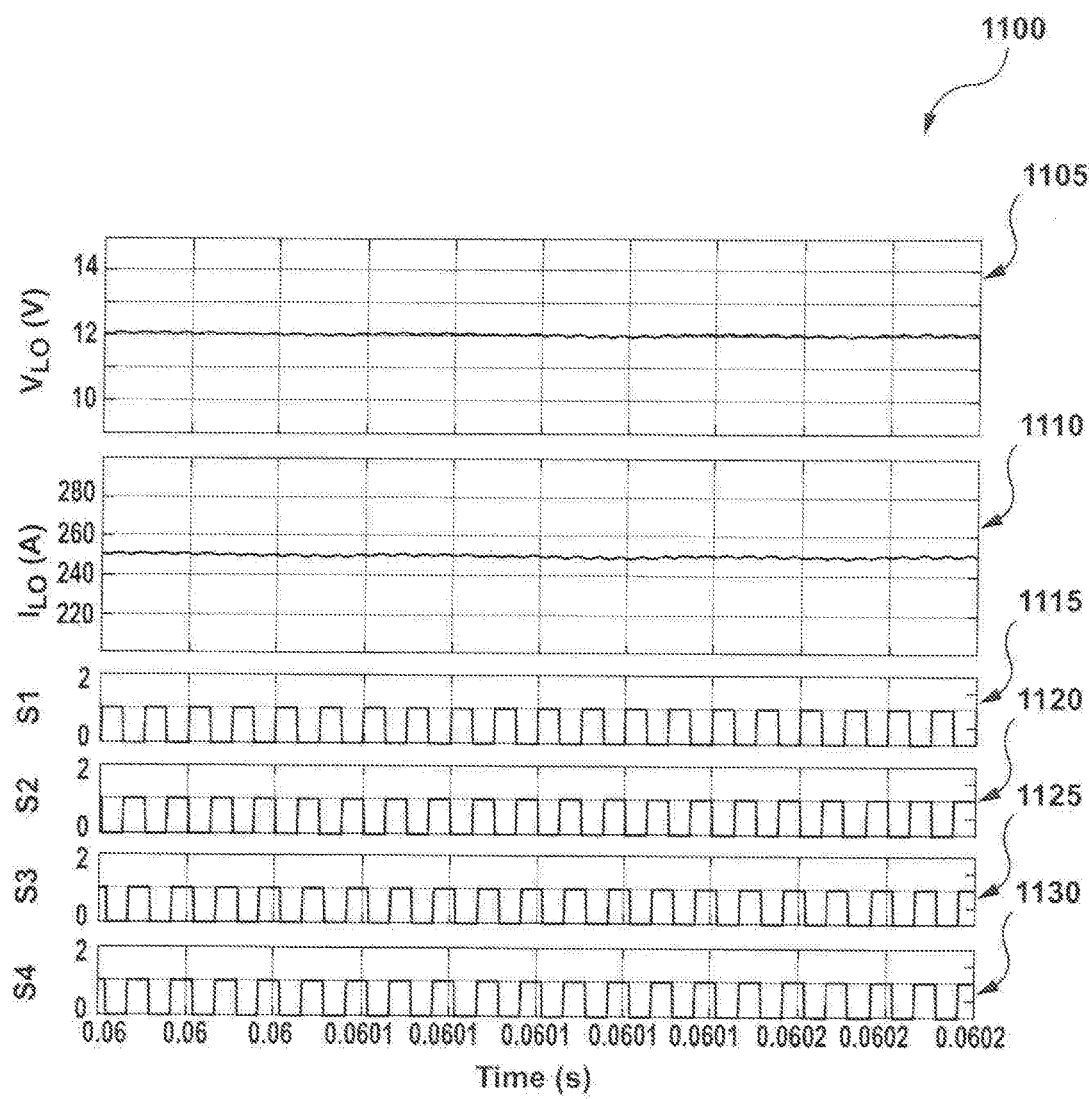
FIG. 11 illustrates a graphical representation of an integrated AFAPM working as a low voltage battery charger according to an example embodiment.

Reference is made to FIG. 11, which illustrates a graph 1100 of an integrated AFAPM, such as the integrated AFAPM 800 of FIG. 8, working as a LV battery charger. Graph 1100 comprises a plot 1105 corresponding to output voltage V$_{LO}$ of a LV battery, plot 1110 corresponding to current I$_{LO}$ through the LV battery, plot 1115 corresponding to the switching cycle of a first switch S$_1$, such as the first switch S$_1$ 820 of FIG. 8 or first switch S$_1$ 920 of FIGS. 9A-9D, plot 1120 corresponding to the switching cycle of a second switch S$_2$, such as the second switch S$_2$ 825 of FIG. 8 or second switch S$_2$ 925 of FIGS. 9A-9D, plot 1125 corresponding to the switching cycle of a third switch S$_3$, such as the third switch S$_3$ 830 of FIG. 8 or third switch S$_3$ 930 of FIGS. 9A-9D, and plot 1130 corresponding to the switching cycle of a fourth switch S$_4$, such as the fourth switch S$_4$ 835 of FIG. 8 or fourth switch S$_4$ 935 of FIGS. 9A-9D. As illustrated, all the four switches are operating as a general phase-shift full bridge converter and the output voltage V$_{LO}$ of the LV battery is 12 V.

Figure 12A:
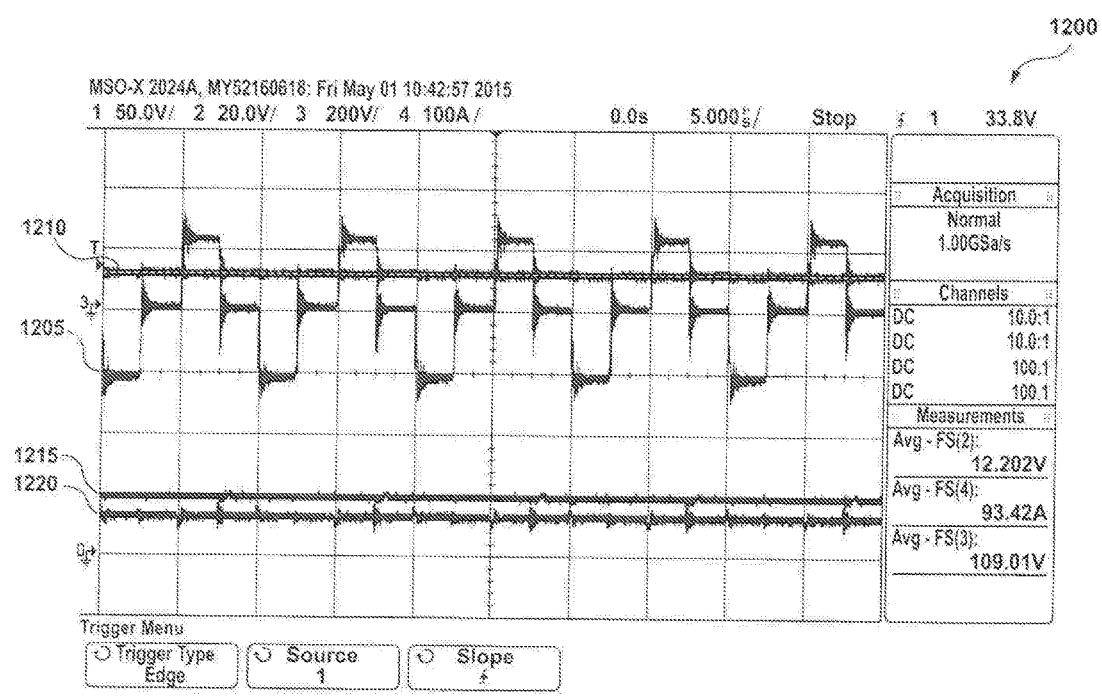
FIG. 12A illustrates a graphical representation of an integrated AFAPM acting in a low voltage battery charging mode according to another example embodiment.
Figure 12B:
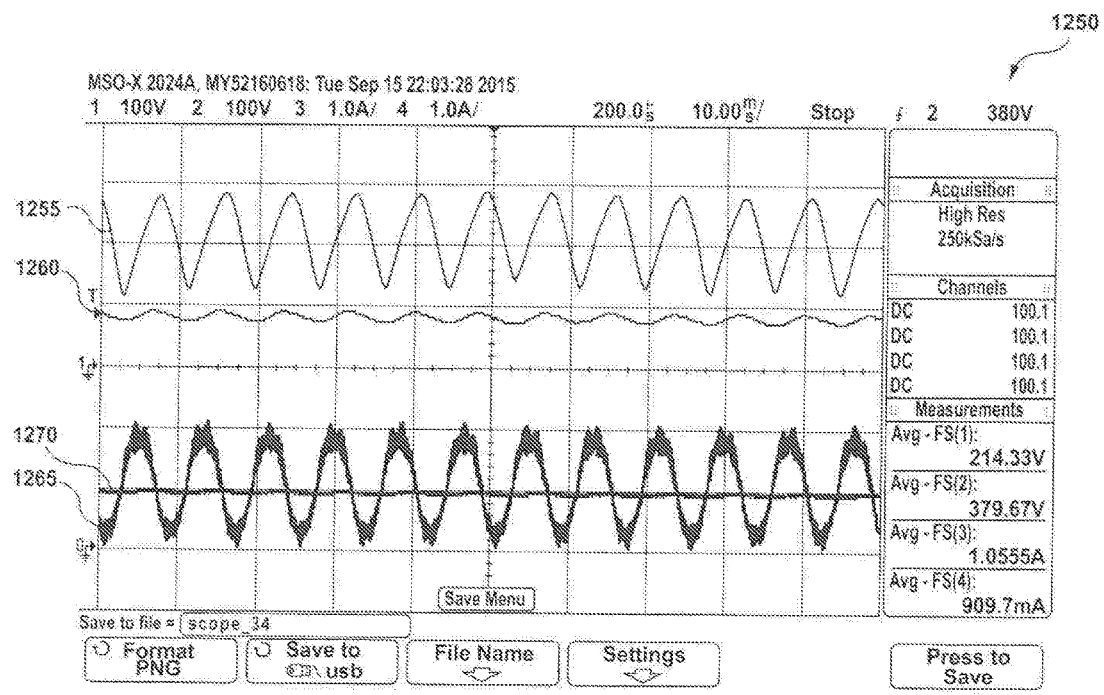
FIG. 12B illustrates a graphical representation of an integrated AFAPM acting in an active filtering mode according to another example embodiment.

Reference is next made to FIGS. 12A and 12B, which illustrate graphical representations of an integrated AFAPM in a LV battery charging mode and an active filtering mode, respectively, based on a proof-of-concept prototype of a 1.2 KW integrated AFAPM.

Reference is now made to FIG. 12A, which illustrates a graph 1200 of an integrated AFAPM acting in a LV battery charging mode according to an example embodiment. In this embodiment, the maximum output power of the LV battery is selected to be 12V/100 A. Graph 1200 comprises a plot 1205 corresponding to a transformer voltage of a transformer isolating the primary side of the integrated AFAPM from the secondary side, such as the transformer 870 of FIG. 8, plot 1210 corresponding to input voltage V$_{dc}$ on the primary side of the integrated AFAPM, plot 1215 corresponding to output current I$_{LO}$ through the LV battery, and plot 1220 corresponding to output voltage V$_{LO}$ across the LV battery.

Reference is made to FIG. 12B, which illustrates a graph 1250 of simulation of an integrated AFAPM acting in an active filtering mode according to an example embodiment. In this embodiment, the active filter design part is based on a 380 W (380V/1 A) power factor correction (PFC) boost converter. Graph 1250 comprises a plot 1255 corresponding to voltage V$_{aux}$ measured across capacitor C$_{aux}$, such as capacitor C$_{aux}$ 810 of FIG. 8, plot 1260 corresponding to input voltage V$_{dc}$ on the primary side of the integrated AFAPM, plot 1265 corresponding to HV battery charging current before the active filter, and plot 1270 corresponding to HV battery charging current after the active filter that charges the HV battery. As illustrated, in the active filtering mode, the second-order wave harmonics current in plot 1265 is assimilated by the APF, leaving the HV battery charging current of plot 1270 with DC component only.

The above-described embodiments and applications of the present invention are intended only to be examples. Alterations, modifications and variations may be effected to the particular embodiments by those of ordinary skill in the art, in light of this teaching, without departing from the spirit of or exceeding the scope of the claimed invention.

The invention claimed is:

1. A dual-voltage charging system comprising:
an AC power source for providing power;
a charger coupled to the AC power source via a first switch, the first switch being operable between a connect mode to connect the charger to the AC power source and a disconnect mode to disconnect the charger from the AC power source;
a high voltage battery coupled to the charger, wherein when the first switch is in the connect mode and the charger is connected to the AC power source, the dual-voltage charging system operates in a filtering mode where the high voltage battery is charged using the AC power source; and
an active filter auxiliary power module coupled to the high voltage battery and a low voltage battery, wherein when the first switch is in the disconnect mode and the charger is disconnected from the AC power source, the dual-voltage charging system operates in a charging mode where the high voltage battery charges the low voltage battery via the active filter auxiliary power module.

2. The dual-voltage charging system of claim 1, wherein the charger is a single-stage charger comprising an AC/DC converter and a DC/DC converter in one stage.

3. The dual-voltage charging system of claim 1, wherein the charger is a two-stage charger comprising a first stage consisting of an AC/DC power factor correction (PFC) boost converter and a second stage consisting of a DC/DC converter.

4. The dual-voltage charging system of claim 3, wherein the DC/DC converter is an isolated DC/DC converter.

5. The dual-voltage charging system of claim 3, wherein the active filter auxiliary power module is located between the first stage and the second stage.

6. The dual-voltage charging system of claim 5, wherein the active filter auxiliary power module is located between the first stage and the second stage via a second switch, the second switch being operable between a first mode and a second mode, wherein:
in the first mode, the second switch is connected to the first stage and the second stage, and the dual-voltage charging system operates in the filtering mode, and
in the second mode, the second switch is disconnected from the first stage and the second stage, and connected to the high voltage battery, and the dual-voltage charging system operates in the charging mode.

7. The dual-voltage charging system of claim 6, wherein the second switch is a mechanical double pole double throw switch.

8. The dual-voltage charging system of claim 1, wherein the active filter auxiliary power module comprises:
at least one ripple filter for filtering second-order frequency harmonics of the AC power source;
at least one primary power switch coupled to the at least one ripple filter and operable to switch the dual-voltage charging system in the filtering mode;
at least one secondary power switch operable to switch the dual-voltage charging system in the charging mode;
at least one low voltage battery filter coupled to the at least one secondary power switch, the at least one low voltage battery filter and the at least one secondary power switch forming at least one DC/DC converter; and
a transformer coupled to the at least one primary power switch on a primary side of the transformer and the at least one secondary power switch on a secondary side of the transformer.

9. The dual-voltage charging system of claim 8, wherein the transformer converts high-voltage low-current second-order frequency harmonics to low-voltage high-current frequency harmonics.

10. The dual-voltage charging system of claim 1, wherein the AC power source is located external to an electrified vehicle, and the charger, the high voltage battery, the active filter auxiliary power module and the low voltage battery are located internal to the electrified vehicle.

11. An active filter auxiliary power module for use in a dual-voltage charging system within an electrified vehicle, the active filter auxiliary power module comprising:
at least one ripple filter for filtering second-order frequency harmonics of an AC power source located external to the electrified vehicle and providing filtered AC power to charge a high voltage battery within the electrified vehicle;
at least one primary power switch coupled to the at least one ripple filter and operable to switch the dual-voltage charging system in a filtering mode wherein when the dual-voltage charging system in the filtering mode, the high voltage battery is charged by the AC power source via a charger;
at least one secondary power switch operable to switch the dual-voltage charging system in a charging mode wherein when the dual-voltage charging system in the charging mode, a low voltage battery is charged by the high voltage battery;
at least one low voltage battery filter coupled to the at least one secondary power switch, the at least one low voltage battery filter and the at least one secondary power switch forming at least one DC/DC converter; and
a transformer coupled to the at least one primary power switch on a primary side of the transformer and the at least one secondary power switch on a secondary side of the transformer.

12. An active filter auxiliary power module for use in a dual-voltage charging system within an electrified vehicle, wherein the dual-voltage charging system comprises an external AC power source for providing power, a charger coupled to the external AC power source via a first switch, the first switch being operable between a connect mode to connect the charger to the external AC power source and a disconnect mode to disconnect the charger from the external AC power source, and a high voltage battery coupled to the charger, wherein when the first switch is in the connect mode and the charger is connected to the external AC power source, the dual-voltage charging system operates in a filtering mode where the high voltage battery is charged using the external AC power source, and wherein the active filter auxiliary power module is coupled to the high voltage battery and a low voltage battery, wherein when the first switch is in the disconnect mode and the charger is disconnected from the external AC power source, the dual-voltage charging system operates in a charging mode where the high voltage battery charges the low voltage battery via the active filter auxiliary power module, the active filter auxiliary power module comprising:

at least one ripple filter for filtering second-order frequency harmonics of the external AC power source;

at least one primary power switch coupled to the at least one ripple filter and operable to switch the dual-voltage charging system in the filtering mode;

at least one secondary power switch operable to switch the dual-voltage charging system in the charging mode;

at least one low voltage battery filter coupled to the at least one secondary power switch, the at least one low voltage battery filter and the at least one secondary power switch forming at least one DC/DC converter; and a transformer coupled to the at least one primary power switch on a primary side of the transformer and the at least one secondary power switch on a secondary side of the transformer.

13. A method for operating a dual-voltage charging system within an electrified vehicle, the method comprising:

connecting a charger to an external AC power source via a first switch, the first switch being operable between a connect mode to connect the charger to the external AC power source and a disconnect mode to disconnect the charger from the external AC power source;

coupling a high voltage battery to the charger, wherein when the first switch is in the connect mode and the charger is connected to the external AC power source, the dual-voltage charging system operates in a filtering mode where the high voltage battery is charged using the external AC power source; and coupling an active filter auxiliary power module to the high voltage battery and a low voltage battery, wherein when the first switch is in the disconnect mode and the charger is disconnected from the external AC power source, the dual-voltage charging system operates in a charging mode where the high voltage battery charges the low voltage battery via the active filter auxiliary power module.

14. The method of claim 13, wherein the charger is a single-stage charger comprising an AC/DC converter and a DC/DC converter in one stage.

15. The method of claim 13, wherein the charger is a two-stage charger comprising a first stage consisting of an AC/DC power factory correction (PFC) boost converter and a second stage consisting of a DC/DC converter.

16. The method of claim 15, further comprising coupling the active filter auxiliary power module to the first stage and the second stage.

17. The method of claim 15, further comprising coupling the active filter auxiliary power module to the first stage and the second stage via a second switch, wherein the second switch is operable between a first mode and a second mode, and wherein:

in the first mode, the second switch is connected to the first stage and the second stage, and the dual-voltage charging system operates in the filtering mode, and in the second mode, the second switch is disconnected from the first stage and the second stage, and connected to the high voltage battery, and the dual-voltage charging system operates in the charging mode.

18. The method of claim 13, wherein the active filter auxiliary power module comprises:

at least one ripple filter for filtering second-order frequency harmonics of the external AC power source;

at least one primary power switch coupled to the at least one ripple filter and operable to switch the dual-voltage charging system in the filtering mode;

at least one secondary power switch operable to switch the dual-voltage charging system in the charging mode;

at least one low voltage battery filter coupled to the at least one secondary power switch, the at least one low voltage battery filter and the at least one secondary power switch forming at least one DC/DC converter; and a transformer coupled to the at least one primary power switch on a primary side of the transformer and the at least one secondary power switch on a secondary side of the transformer.

19. The method of claim 18, wherein the transformer converts a high-voltage low-current second-order frequency harmonics to low-voltage high-current frequency harmonics.

20. The method of claim 13, wherein the AC power source is located external to an electrified vehicle, and the charger, the high voltage battery, the active filter auxiliary power module and the low voltage battery are located internal to the electrified vehicle.

* * * * *